United States Patent
Shiozaki et al.

(10) Patent No.: US 7,062,120 B2
(45) Date of Patent: Jun. 13, 2006

(54) OPTICAL DEVICE AND MOVABLE REFLECTOR

(75) Inventors: Manabu Shiozaki, Yokohama (JP); Makoto Katayama, Yokohama (JP); Tomomi Sano, Yokohama (JP); Michiko Takushima, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/986,449

(22) Filed: Nov. 12, 2004

(65) Prior Publication Data

US 2005/0141805 A1 Jun. 30, 2005

Related U.S. Application Data

(60) Provisional application No. 60/580,132, filed on Jun. 17, 2004, provisional application No. 60/520,661, filed on Nov. 18, 2003.

(30) Foreign Application Priority Data

Nov. 14, 2003 (JP) ............................. P2003-385809
Jun. 4, 2004 (JP) ............................. P2004-167664

(51) Int. Cl.
*G02B 6/35* (2006.01)
*G02B 6/26* (2006.01)

(52) U.S. Cl. ...................... 385/18; 385/140

(58) Field of Classification Search ............... None
See application file for complete search history.

(56) References Cited

U.S. PATENT DOCUMENTS

| | | | | |
|---|---|---|---|---|
| 5,517,367 A | * | 5/1996 | Kim et al. | 359/864 |
| 5,933,270 A | * | 8/1999 | Toyohara | 359/341.3 |
| 6,148,124 A | * | 11/2000 | Aksyuk et al. | 385/24 |
| 6,222,656 B1 | * | 4/2001 | Eu | 398/9 |
| 6,445,502 B1 | * | 9/2002 | Islam et al. | 359/571 |
| 6,718,114 B1 | * | 4/2004 | Hong et al. | 385/140 |
| 6,751,395 B1 | * | 6/2004 | Novotny et al. | 385/140 |
| 6,917,747 B1 | * | 7/2005 | Xiao et al. | 385/140 |
| 2002/0181876 A1 | | 12/2002 | Chang | |
| 2002/0181928 A1 | | 12/2002 | Chen et al. | |
| 2003/0174933 A1 | | 9/2003 | Naganuma | |

FOREIGN PATENT DOCUMENTS

FR 2 835 929 8/2003

OTHER PUBLICATIONS

Marxer, C., et al. "Micro-Opto-Mechanical 2×2 Switch for Single Mode Fibers based on Plasma-Etched Silicon Mirror and Electrostatic Actuation." 11th IEEE Workshop on Micro-Electro-Mechanical System, 1998, pp. 233-237.

* cited by examiner

*Primary Examiner*—John D. Lee
*Assistant Examiner*—Mike Stahl
(74) *Attorney, Agent, or Firm*—McDermott Will & Emery LLP

(57) ABSTRACT

An optical device has first and second non-parallel optical paths, and a light reflecting surface. The reflecting surface may have a first and second planar portion. The first planar portion receives light from the first path to reflect the light toward the second path. The second planar portion may form an angle $\theta 1$ with the first planar portion. Angle $\theta 1$ satisfies a condition of $175° \leq \theta < 180°$ in either clockwise or counterclockwise rotation from the first planar portion.

8 Claims, 27 Drawing Sheets

*Fig.14*

| OFB [dB] | CUR [1/$\mu$m] | ROC [$\mu$m] |
|---|---|---|
| -35 | 0.0232 | 43 |
| -40 | 0.0104 | 96 |
| -45 | 0.0053 | 190 |
| -50 | 0.0028 | 354 |

*Fig.27*
(a)
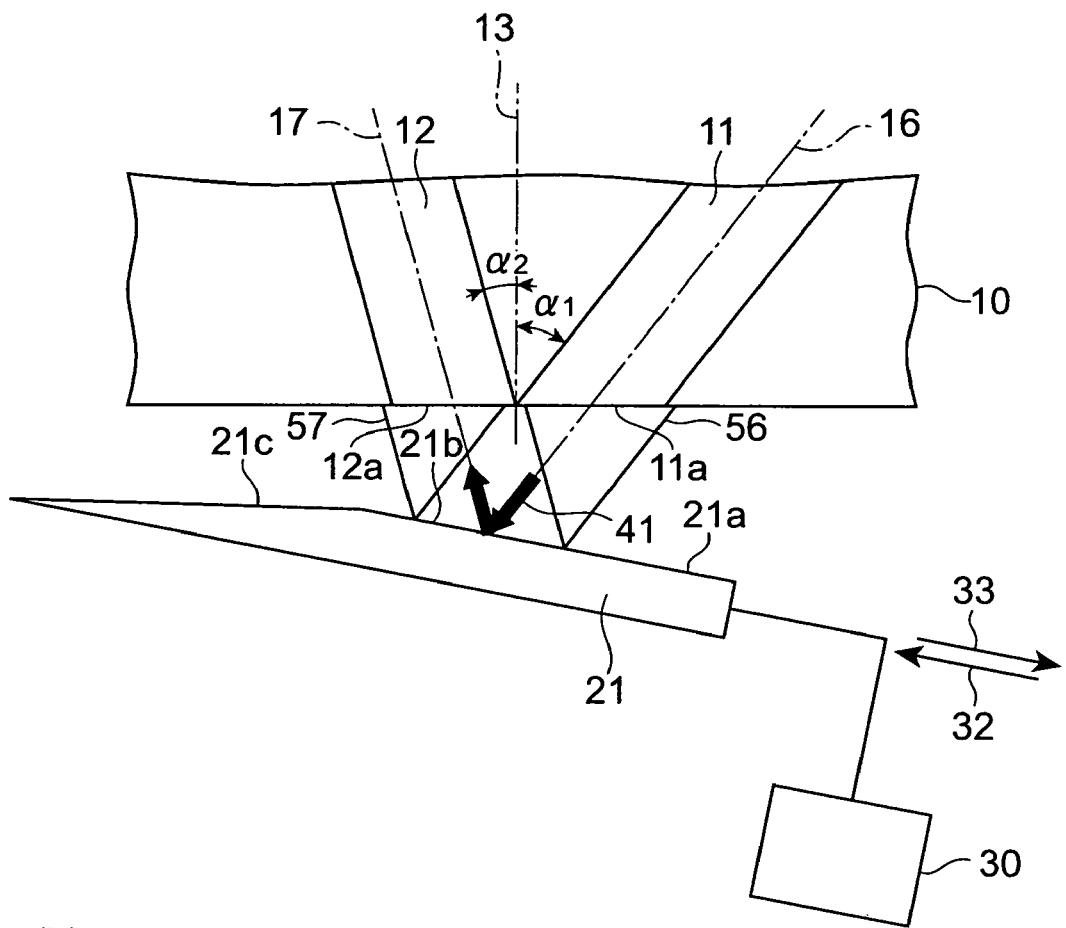
(b)
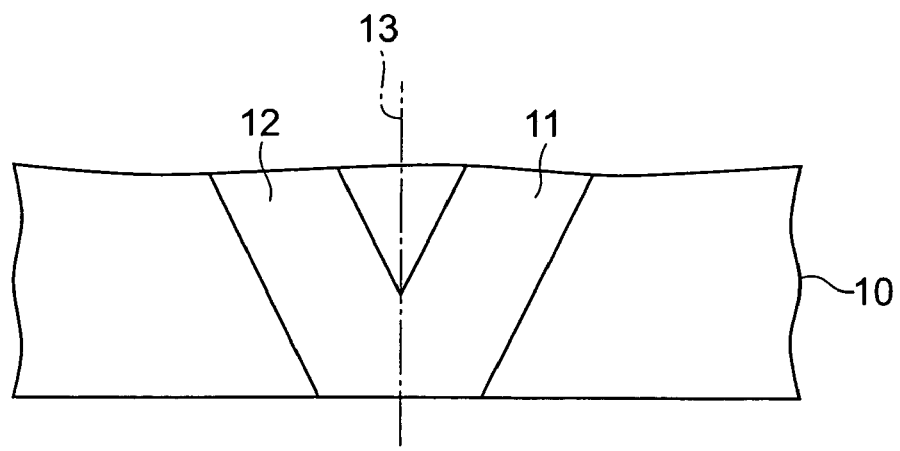

OPTICAL DEVICE AND MOVABLE REFLECTOR

CROSS-REFERENCE TO PROVISIONAL APPLICATIONS

This Application claims priority from Provisional Application Ser. No. 60/520661 filed on Nov. 18, 2003 and from Provisional Application Ser. No. 60/580132 filed on Jun. 17, 2004, the entire disclosure of each such Provisional Application is hereby incorporated by reference herein.

BACKGROUND OF THE INVENTION

1. Field of the Invention

The present invention relates to optical devices for varying the power of light propagating from a first optical path to a second optical path, and to movable reflectors used in such optical devices.

2. Related Background Art

Optical communications are often performed using optical devices, e.g., variable optical attenuators or optical switches, for adjusting the power of optical signals propagating in optical waveguides. An example of such optical devices is disclosed in C. Marxer et al., "Micro-Opto-Mechanical 2×2 Switch for Single Mode Fibers based on Plasma-Etched Silicon Mirror and Electrostatic Actuation" (preceding 11th IEEE Workshop on Micro-Electro-Mechanical System, 1998, pp 233–237). In this example, a mirror is placed in an optical path from a first optical waveguide to a second optical waveguide, and the mirror is moved to vary the quantity of light reflected by the mirror, thereby adjusting the power of the light fed from the first optical waveguide into the second optical waveguide.

FIG. 1 is a schematic plan view showing an example of a variable optical attenuator using a movable mirror. The variable optical attenuator 50 has a Planar Lightwave Circuit (PLC) 10, a movable mirror 20, and a mirror driver device 30. Optical waveguides 11 and 12 in PLC 10 have their respective ends arranged in mirror symmetry with respect to a reference plane 13. These ends have respective end faces 11a and 12a aligned on an identical plane. The movable mirror 20 has a reflecting surface 20a parallel to these end faces 11a and 12a. The mirror driver device 30 can move the movable mirror 20 along directions indicated by arrows 32 and 33. When light from the optical waveguide 11 is incident onto the reflecting surface 20a, it is reflected toward the optical waveguide 12. This causes the light to propagate from the optical waveguide 11 to the optical waveguide 12. On the other hand, when the light from the optical waveguide 11 is not incident onto the reflecting surface 20a, the light does not enter the optical waveguide 12.

As shown in FIG. 1, the movable mirror 20 has an edge 20b. At the edge 20b the incident light is scattered into various directions by virtue of diffraction. For this reason, part of the light from the optical waveguide 11 returns to the optical waveguide 11, and again propagates in the optical waveguide 11. This light is optical feedback to the optical waveguide 11. Likewise, light emerging from the optical waveguide 12 is also scattered by the edge 20b and part thereof returns to the optical waveguide 12. Such optical feedback deforms the waveform of the signal light propagating in the optical waveguides 11 and 12, so as to cause communication error in certain cases.

SUMMARY OF THE INVENTION

It is an object of the present invention to reduce the optical feedback to at least one of optical paths in an optical device for changing the power of light traveling from one optical path to another optical path.

FIG. 2 shows a relationship between the position of the mirror edge 20b and coupling efficiency in the variable optical attenuator 50 shown in FIG. 1. When the mirror edge position is 0 μm, the edge 20b is located on the reference plane 13 between the optical waveguides 11 and 12. In FIG. 2 a solid line indicates the coupling efficiency of light traveling from the optical waveguide 11 to the optical waveguide 12, a chain line the coupling efficiency of optical feedback from the optical waveguide 11 to the optical waveguide 11, and a chain double-dashed line the coupling efficiency of optical feedback from the optical waveguide 12 to the optical waveguide 12. In FIG. 2, the chain line and the chain double-dashed line are superimposed on each other. In the variable optical attenuator 50, as shown in FIG. 2, the coupling efficiencies of optical feedbacks to the optical waveguides 11 and 12 are high. Therefore, the waveform of signal light in the optical waveguides is likely to deform.

A conceivable method of preventing the deformation of the waveform of signal light is to couple isolators 51 and 52 with the optical waveguides 11 and 12, respectively, as shown in FIG. 3. When signal light 55 propagating through the optical waveguide 11 is reflected by the movable mirror 20, it enters the optical waveguide 12 and propagates therein. Optical feedback 56 to the optical waveguide 11, which is produced by scattering at the edge 20b of the movable mirror 20, is blocked by the isolator 51 connected to the optical waveguide 11. The isolator 52 connected to the optical waveguide 12 also blocks optical feedback 57 from an external device coupled with the variable optical attenuator 50, to prevent incidence of the optical feedback 57 into the variable optical attenuator 50. Therefore, it also prevents occurrence of optical feedback from the optical waveguide 12 to the optical waveguide 12. A typical tolerance for the coupling efficiency of optical feedback is −45 dB; however, different tolerances are determined depending on systems using the variable optical attenuator.

The use of isolators as described above can suppress the influence of optical feedback on the signal light in an optical communication system using the variable optical attenuator. However, the isolators have to be coupled with the optical waveguides, which complicates the construction of the system and which also increases the production cost of the system. Hence, the Inventors invented new optical devices capable of reducing the optical feedback.

In one aspect, the present invention relates to an optical device. This optical device comprises a first and second optical path having axes not parallel to each other, and a light reflecting surface movable along a predetermined path.

The light reflecting surface may have a first planar portion for reflecting light from the first optical path toward the second optical path, and a second planar portion having a connection to the first planar portion. The light reflecting surface may be movable to allow the connection between the first and second planar portions to cross the optical axis of the first optical path. The second planar portion may form an angle θ1 with the first planar portion. Angle θ1 satisfies a condition of $175° \leq \theta1 < 180°$ in either clockwise or counterclockwise rotation from the first planar portion.

The optical device may further comprise an optical waveguide for receiving light reflected by the second planar portion.

The optical device may further comprise at least either an optical waveguide optically coupled to the first optical path or an optical waveguide optically coupled to the second optical path.

The light reflecting surface may have a first planar portion for reflecting light from the first optical path toward the second optical path, and a curved portion having a connection to the first planar portion. The light reflecting surface may be movable to allow the connection between the first planar portion and the curved portion to cross the optical axis of the first optical path. The curved portion may have a tangent plane at the connection forming an angle θ2 with the first planar portion. Angle θ2 satisfies a condition of 175°≦θ2≦180° in either clockwise or counterclockwise rotation from the first planar portion. When θ2 is 180°, the curved portion is smoothly connected to the first planar portion.

The light reflecting surface may have a second planar portion having a connection to the curved portion at a location away from the first planar portion. The first planar portion and planes tangent to the curved portion may form angles that vary monotonically with their distance from the first planar portion. The second planar portion may form an angle θ3 with a plane tangent to the curved portion at the location away from the first planar portion. Angle θ3 satisfies a condition of 175°≦θ3≦180° in either clockwise or counterclockwise rotation from the tangent plane at the location away from the first planar portion.

The optical device may further comprise an optical waveguide for receiving light reflected by the second planar portion.

The curved portion may be twisted relative to the first planar portion.

The optical device may further comprise at least either an optical waveguide optically coupled to the first optical path or an optical waveguide optically coupled to the second optical path.

In another aspect, the present invention relates to an optical device comprising first to Nth (N is an integer of 2 or more) pairs of optical paths, each pair including a first and second optical path having optical axes not parallel to each other; first to Nth light reflecting surfaces movable along predetermined paths; an optical decomposer for decomposing multiplexed light that contains first to Nth components having different characteristics into the first to Nth components; and an optical composer for combining the decomposed first to Nth components into the multiplexed light. The Kth (K is an integer from 1 to N) decomposed component travels through the first optical path of the Kth pair.

The Kth reflecting surface may have a first planar portion for reflecting the Kth decomposed component from the first optical path of the Kth pair toward the second optical path of the Kth pair, and a second planar portion having a connection to the first planar portion. The Kth reflecting surface may be movable to allow the connection between the first and second planar portions of the Kth reflecting surface to cross the optical axis of the first optical path of the Kth pair. In the Kth reflecting surface, the second planar portion may form an angle θ1 with the first planar portion. Angle θ1 satisfies a condition of 175°≦θ1<180° in either clockwise or counterclockwise rotation from the first planar portion. The optical composer combines the first to Nth components traveling on the second optical paths of the first to Nth pairs.

The Kth reflecting surface may have a first planar portion for reflecting the Kth decomposed component from the first optical path of the Kth pair toward the second optical path of the Kth pair, and a curved portion having a connection to the first planar portion. The Kth reflecting surface may be movable to allow the connection between the first planar portion and the curved portion of the Kth reflecting surface to cross the optical axis of the first optical path of the Kth pair. In the Kth reflecting surface, the curved portion may have a tangent plane at the connection forming an angle θ2 with the first planar portion. Angle θ2 satisfies a condition of 175°≦θ2≦180° in either clockwise or counterclockwise rotation from the first planar portion. The optical composer may combine the first to Nth components traveling on the second optical paths of the first to Nth pairs.

The first to Nth components may have different wavelengths. The multiplexed light may be wavelength-multiplexed light that contains the first to Nth components. The optical decomposer may be an optical demultiplexer for demultiplexing the wavelength-multiplexed light into the first to Nth components. The optical composer may be an optical multiplexer for multiplexing the first to Nth components into the wavelength-multiplexed light.

In further aspect, the present invention relates to a movable reflector comprising a light reflecting surface, and a driver device capable of moving the light reflecting surface along a predetermined movement path.

The light reflecting surface may have a first planar portion, and a second planar portion having a connection to the first planar portion. The second planar portion may form an angle θ1 with the first planar portion. Angle θ1 satisfies a condition of 175°≦θ1<180° in either clockwise or counterclockwise rotation from the first planar portion.

The light reflecting surface may have a first planar portion, and a curved portion having a connection to the first planar portion. The curved portion may have a tangent plane at the connection forming an angle θ2 with the first planar portion. Angle θ2 satisfies a condition of 175°≦θ2≦180° in either clockwise or counterclockwise rotation from the first planar portion. When θ2 is 180°, the curved portion is smoothly connected to the first planar portion.

The light reflecting surface may have a second planar portion having a connection to the curved portion at a location away from the first planar portion. The first planar portion and planes tangent to the curved portion may form angles that vary monotonically with their distance from the first planar portion. The second planar portion may form an angle θ3 with a plane tangent to the curved portion at the location away from the first planar portion. Angle θ3 satisfies a condition of 175°≦θ3≦180° in either clockwise or counterclockwise rotation from the tangent plane at the location away from the first planar portion.

The curved portion may be twisted relative to the first planar portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 14 is a table showing typical values on the graph shown in FIG. 13.

FIG. 27 is a schematic plan view showing other examples of the optical waveguides.

DESCRIPTION OF THE PREFERRED EMBODIMENTS

Figure 1:
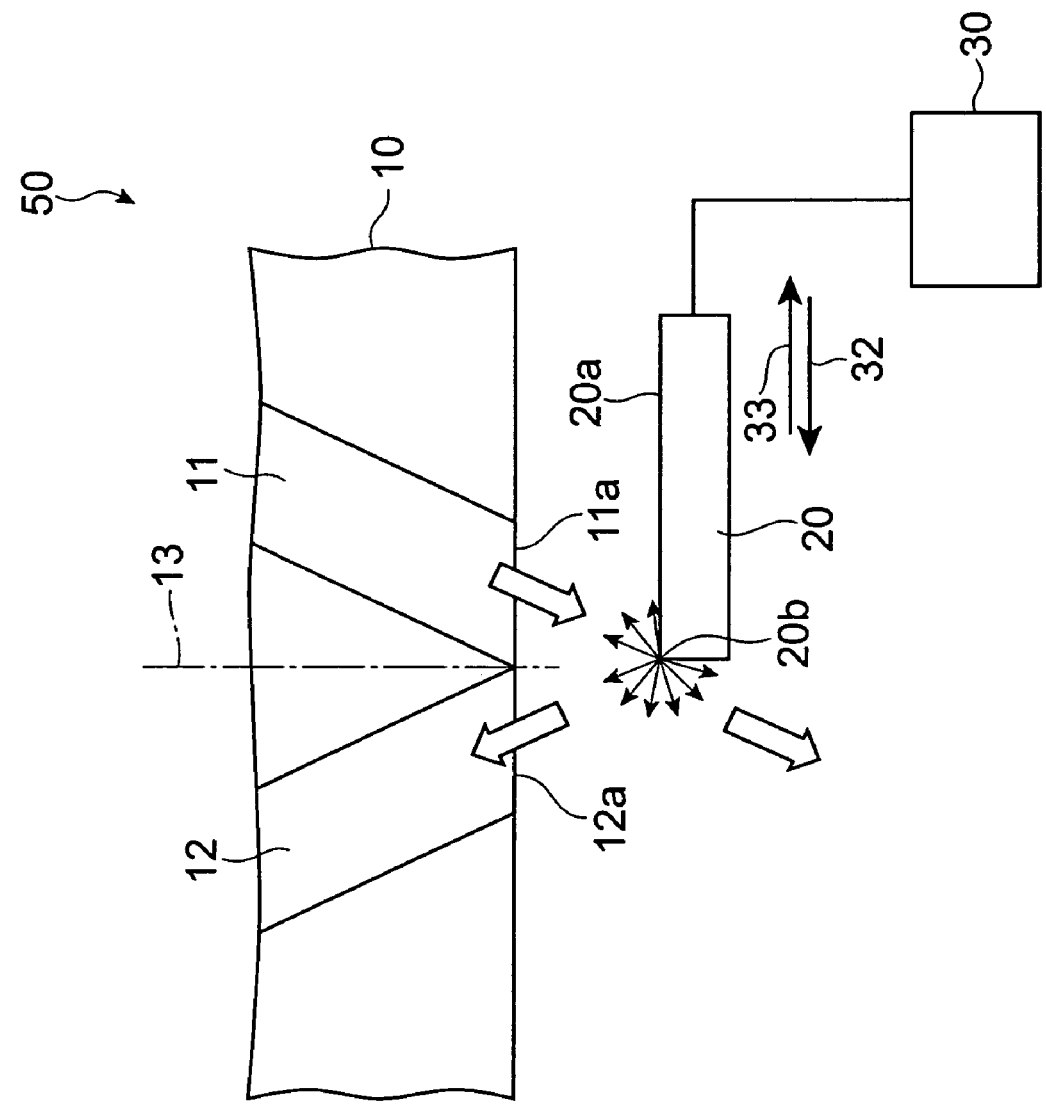
FIG. 1 is a schematic plan view showing an example of a variable optical attenuator.

The preferred embodiments of the present invention will be described below in greater detail with reference to the accompanying drawings. To facilitate understanding, identical reference numerals are used, where possible, to designate identical or equivalent elements that are common to the embodiments, and, in subsequent embodiments, these elements will not be further explained.

First Embodiment

Figure 4:
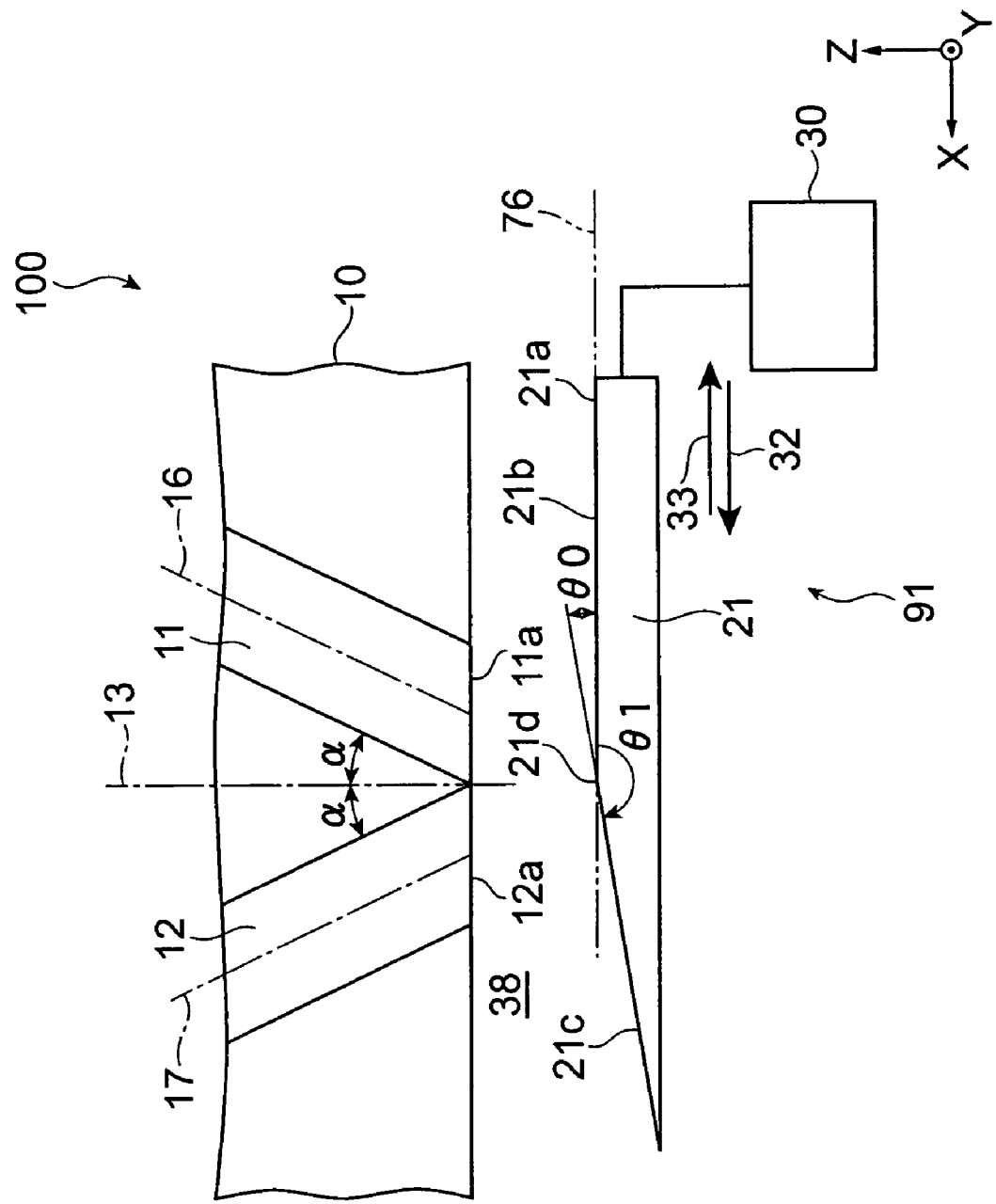
FIG. 4 is a schematic plan view showing a variable optical attenuator of a first embodiment.

FIG. 4 is a schematic plan view showing an optical device of the first embodiment. This optical device is a variable optical attenuator 100. The variable optical attenuator 100 has a Planar Lightwave Circuit (PLC) 10, a movable mirror 21, and a mirror driver device 30. The mirror 21 and the mirror driver device 30 constitute a movable reflector 91. These components are set in a housing (not shown).

PLC 10 has two optical waveguides 11 and 12. The optical waveguides 11 and 12 are planar waveguides extending in parallel with the plane of FIG. 4. The optical waveguides 11 and 12 are made, for example, of silica glass. The optical waveguides 11 and 12, as shown in FIG. 4, have their respective end portions arranged in symmetry (in mirror symmetry in the present embodiment) with respect to a reference plane 13 perpendicular to the plane of FIG. 4. Each of these end portions linearly extends with an inclination of an angle $\alpha$ relative to the reference plane 13. At these end portions, an angle $2\alpha$ is formed between an optical axis 16 of the optical waveguide 11 and an optical axis 17 of the optical waveguide 12. An end face 11a of the optical waveguide 11 and an end face 12a of the optical waveguide 12 are placed on a plane normal to the plane of FIG. 4.

The movable mirror 21 is an optical reflector having a light reflecting surface 21a. The movable mirror 21 is a prism extending perpendicularly to the plane of FIG. 4, and has a uniform cross section along the direction normal to the plane of FIG. 4. The light reflecting surface 21a has an extremely high reflectance (e.g., 90% or more) for light of a predetermined wavelength propagating in the optical waveguides 11 and 12. The light reflecting surface 21a faces the end faces 11a and 12a of the optical waveguides 11 and 12. The clearance between the light reflecting surface 21a and the end faces 11a and 12a may be filled with an index matching material 38.

The light reflecting surface 21a includes a first planar portion 21b and a second planar portion 21c connected to each other. The connection (boundary) between the first planar portion 21b and the second planar portion 21c forms an edge 21d. The first and second planar portions 21b and 21c, and the edge 21d all extend perpendicularly to the plane of FIG. 4. The first planar portion 21b is parallel to the end faces 11a and 12a of the optical waveguides 11 and 12. As shown in FIG. 4, the second planar portion 21c forms an angle of $\theta 1$ in clockwise rotation from the first planar portion 21b. The angle $\theta 1$ is a supplement of an acute angle $\theta 0$ between the first planar portion 21b and an extending plane from the second planar portion 21c. That is, $\theta 0+\theta 1=180°$. In the present embodiment, as described later, $175° \leq \theta 1 < 180°$, and $0 < \theta 0 \leq 5°$.

An XYZ orthogonal coordinate system is depicted in FIG. 4, for convenience' sake of description. The X-axis extends along a line of intersection between the first planar portion 21b and a plane including both the optical axes 16 and 17 of the waveguides 11 and 12. The Y-axis extends perpendicularly to the X-axis in the plane normal to a bisector of the angle between the optical axes 16 and 17. The Z-axis extends in parallel with the bisector.

The mirror driver device 30 moves the movable mirror 21 in directions nearly parallel to the end faces 11a and 12a of the optical waveguides 11 and 12, as indicated by arrows 32 and 33. In other words, the mirror driver device 30 moves the movable mirror 21 substantially in parallel with the XY plane. In accordance therewith, the light reflecting surface 21a of the movable mirror 21 moves along a movement path 76 substantially parallel to the XY plane. The movement of the movable mirror 21 is reversible. Light from the optical waveguides 11 and 12 is reflected by the first planar portion 21b or by the second planar portion 21c, depending upon the location of the light reflecting surface 21a. An example of the mirror driver device 30 is an electrostatic actuator as described in C. Marxer et al. mentioned above.

In the present embodiment, the movement path 76 is of linear shape extending substantially in the X-direction. However, the movement path 76 may also be of curved shape. If curvature is sufficiently large, the light reflecting surface 21a can be moved substantially in the X-direction in the vicinity of the end faces of the optical waveguides 11 and 12.

Figure 5:
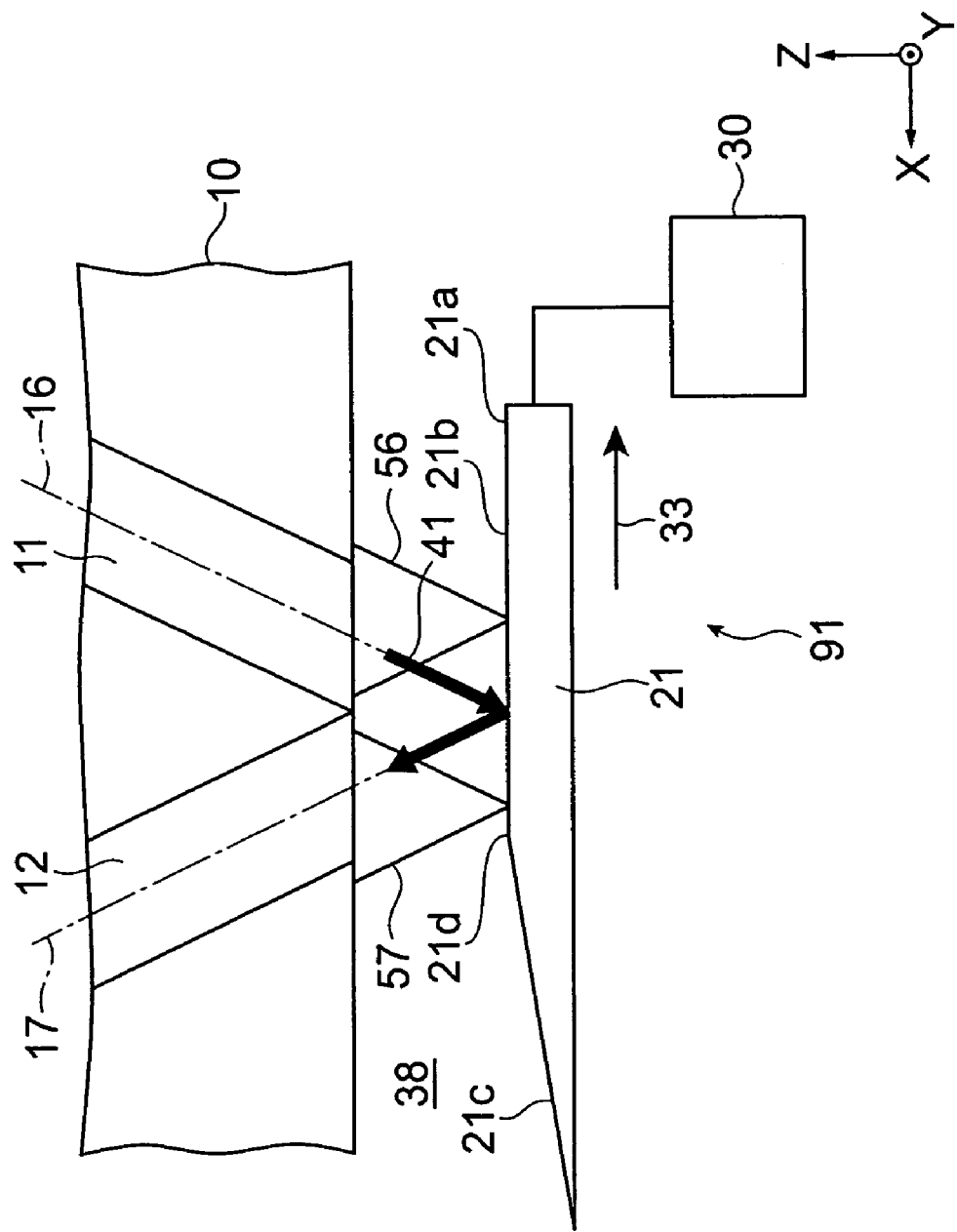
FIG. 5 is a schematic plan view showing reflection of light by a first planar portion of a movable mirror.

FIG. 5 shows reflection of light 41 emerging from the optical waveguide 11 along its optical axis 16 by the first planar portion 21b. As shown in FIG. 5, the variable optical attenuator 100 has optical paths 56 and 57 not parallel to each other. The optical paths 56 and 57 are formed by the optical waveguides 11 and 12. The optical paths 56 and 57 extend between the end faces 11a and 12a of the optical waveguides 11 and 12 and the light reflecting surface 21a, and are optically coupled to the respective optical waveguides 11 and 12. In the present embodiment the clearance between the end faces of the optical waveguides 11 and 12 and the light reflecting surface 21a is filled with the index matching material 38 having a refractive index nearly equal to that of the optical waveguides 11 and 12. For this reason, the optical axes of the optical paths 56 and 57 substantially agree with the optical axes 16 and 17 of the optical waveguides 11 and 12, respectively. The light reflecting surface 21a moves so as to intersect with the optical paths 56 and 57. The connection between the first planar portion 21b and the second planar portion 21c is movable across the optical axes 16 and 17 of these optical paths 56 and 57.

When the movable mirror 21 is placed at the location as shown in FIG. 5, the light 41 emerging from the optical waveguide 11 travels on the optical path 56 toward the mirror 21 and then impinges on the first planar portion 21b. When the first planar portion 21b receives the light 41 from the optical path 56, it reflects the light 41 into the optical path 57 along the optical axis 17. In consequence, the light 41 from the optical waveguide 11 travels along the optical axis 17 into the optical waveguide 12 and propagates in the optical waveguide 12.

Figure 6:
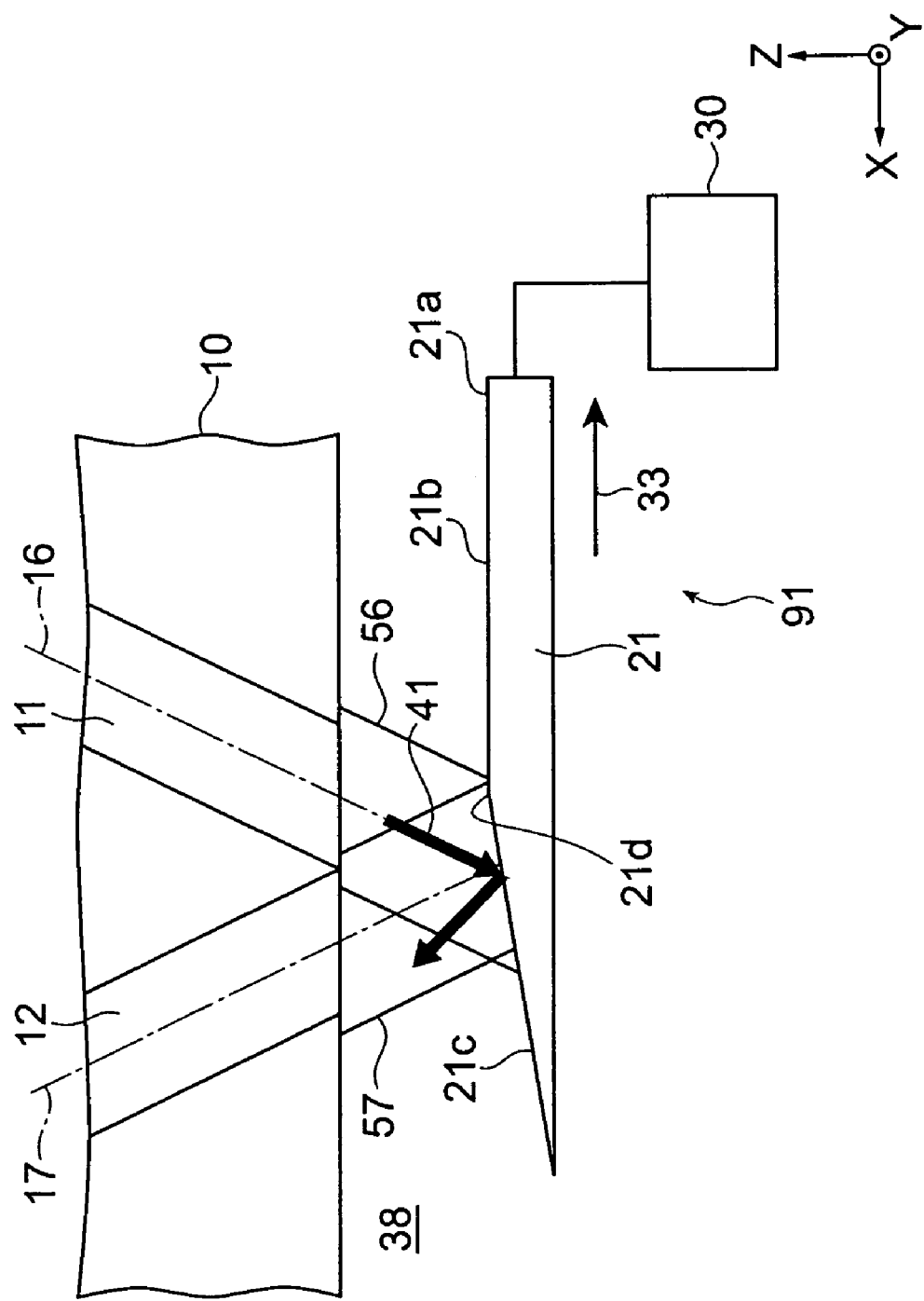
FIG. 6 is a schematic plan view showing reflection of light by a second planar portion of a movable mirror.

As the movable mirror 21 moves in the direction indicated by the arrow 33 from the location shown in FIG. 5, the light 41 comes to be reflected by the second planar portion 21c, as shown in FIG. 6. When the second planar portion 21c receives the light 41, it reflects the light 41 into a direction deviated from the optical axis 17. This decreases the coupling efficiency from the optical path 56 to the optical path 57, and correspondingly the coupling efficiency from the optical waveguide 11 to the optical waveguide 12.

During the movement from the location shown in FIG. 5 to the location shown in FIG. 6, the vicinity of the edge 21d of the movable mirror 21 is irradiated with the light from the optical waveguide 11. In general, light transmitted by an optical waveguide has some divergence in a plane normal to the optical axis of the optical waveguide and the size of the divergence is represented by a Mode Field Diameter (MFD). Hence, when the light from the optical waveguide 11 reaches the vicinity of the edge 21d, part of the light is reflected by the first planar portion 21b and the rest is reflected by the second planar portion 21c. The component reflected by the second planar portion 21c is unlikely to be coupled with the optical path 57 and with the optical waveguide 12. The quantities of light received by the first and second planar portions 21b and 21c vary according to the movement of the light reflecting surface 21a. Therefore, the power of the light propagating from the optical path 56 to the optical path 57 and the power of the light propagating from the optical waveguide 11 to the optical waveguide 12 can be continuously changed according to the movement of the light reflecting surface 21a. Likewise, the power of the light propagating from the optical path 57 to the optical path 56 and the power of the light propagating from the optical waveguide 12 to the optical waveguide 11 can also be changed according to the movement of the light reflecting surface 21a.

Figure 7:
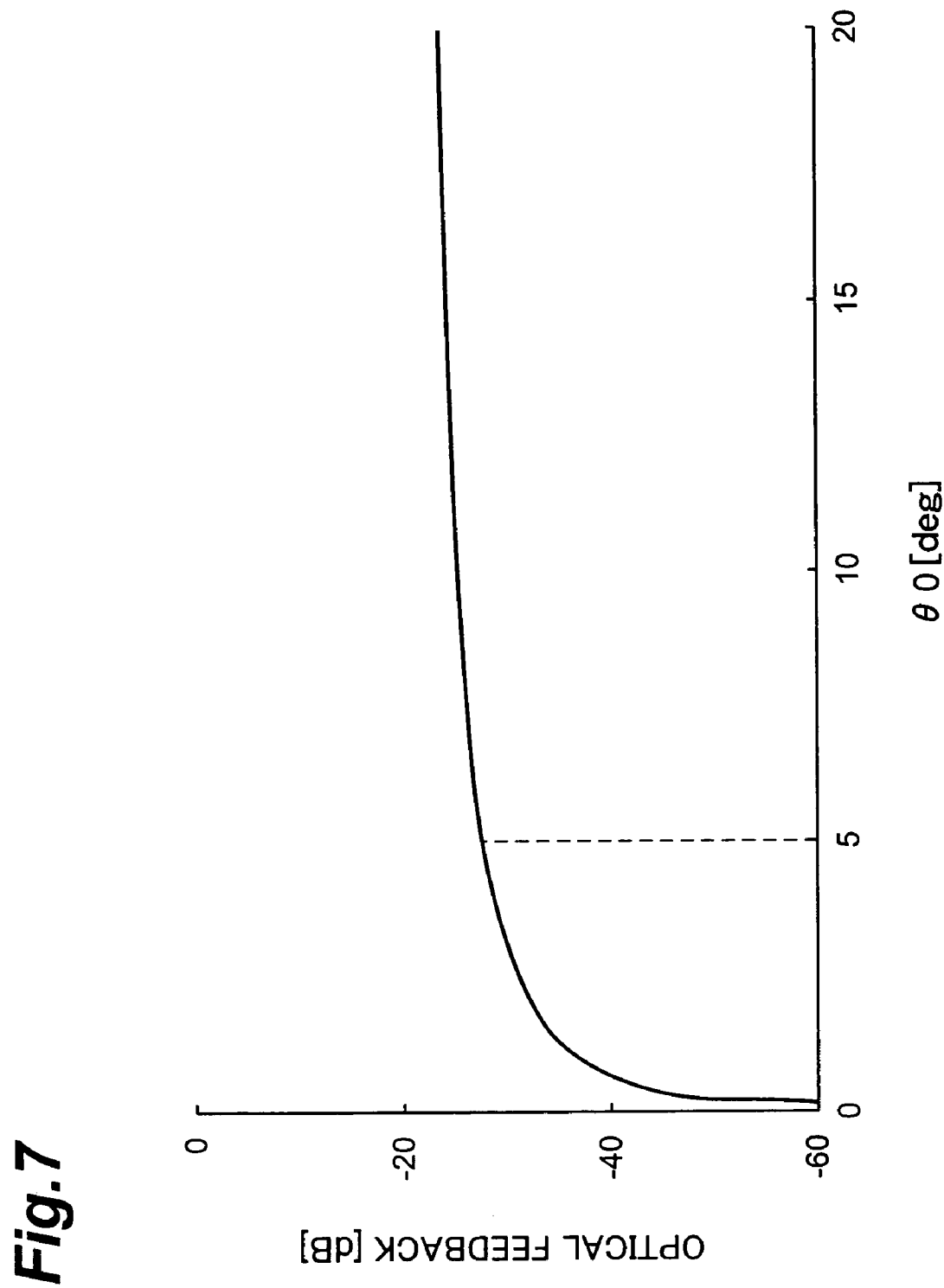
FIG. 7 is a diagram showing a relationship between an angle of a second planar portion and the coupling efficiency of optical feedback.

In the present embodiment, the angle θ1 of the edge 21d of the movable mirror 21 is large enough to reduce the light emerging from the optical waveguide 11 and then returning to the optical waveguide 11. This means reduction of the light coming from the optical path 56 onto the movable mirror 21 and then returning to the optical path 56. FIG. 7 shows a relationship between the angle θ0 shown in FIG. 4 and the coupling efficiency of the optical feedback to the optical waveguide 11. It is assumed herein that the light transmitted by the optical waveguides 11 and 12 has the wavelength of 1.55 µm and the Gaussian distribution with the Mode Field Diameter (MFD) of 20 µm, that the angle 2α between the optical waveguides 11 and 12 is 10°, and that the clearance between the end faces 11a and 12a of the optical waveguides 11 and 12 and the light reflecting surface 21a is filled with the index matching material 38 having the refractive index of 1.45. As shown in FIG. 7, in the range where the angle θ0 is not more than 5°, the coupling efficiency of the optical feedback drastically drops.

In the present embodiment the angle θ1 of the edge 21d is in the range of 175°≦θ1<180°, so that the angle θ0 satisfies the condition of 0<θ0≦5°. Therefore, the optical feedback from the optical waveguide 11 to the optical waveguide 11 can be adequately reduced. For this reason, the variable optical attenuator 100 suitably operates even if the isolator for blocking the optical feedback is not connected to the optical waveguide 11. As a result, it is feasible to readily and inexpensively construct an optical system incorporating the variable optical attenuator 100.

Second Embodiment

Figure 8:
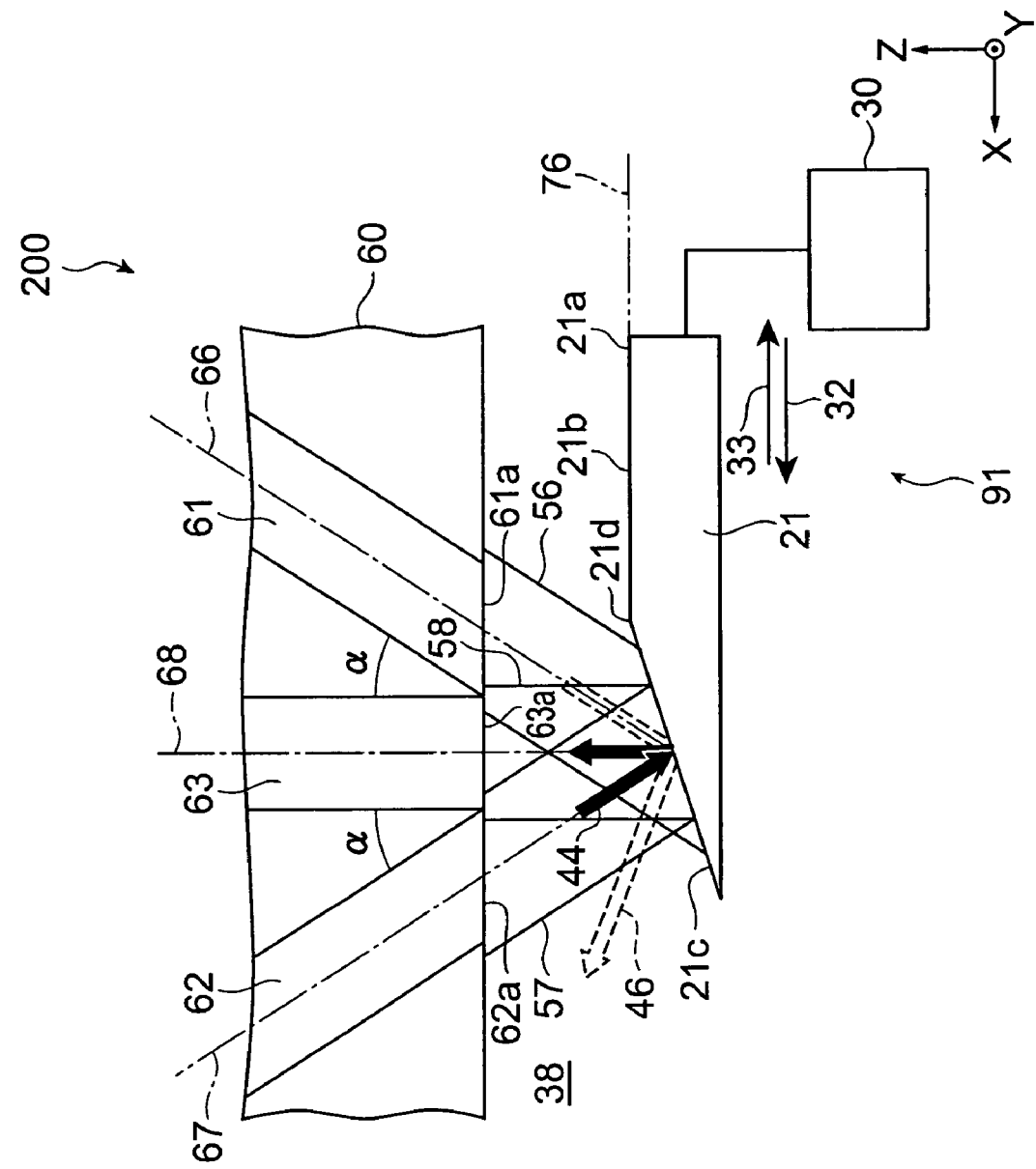
FIG. 8 is a schematic plan view showing a variable optical attenuator of a second embodiment.

FIG. 8 is a schematic plan view showing a variable optical attenuator 200 in the second embodiment. The variable optical attenuator 200 has a PLC 60 instead of the PLC 10 in the variable optical attenuator 100 in the first embodiment. The other structure of the variable optical attenuator 200 is the same as in the first embodiment.

The PLC 60 has three optical waveguides 61, 62, and 63. These optical waveguides are planar waveguides extending in parallel with the plane of FIG. 8, and are made, for example, of silica glass. The optical waveguides 61 and 62 have their respective ends placed in symmetry (in mirror symmetry in the present embodiment) with respect to a reference plane including the optical axis 68 of the optical waveguide 63 and perpendicular to the plane of FIG. 8. These ends each linearly extend with an inclination of an angle α relative to the optical axis 68. Therefore, these ends form an angle 2α. End faces 61a–63a of the optical waveguides 61–63 all are placed on a plane normal to the plane of FIG. 8.

The variable optical attenuator 200 has optical paths 56–58 each extending between the end faces of the optical waveguides 61–63 and the light reflecting surface 21a. In the present embodiment the clearance between the end faces of the optical waveguides 61–63 and the light reflecting surface 21a is filled with the index matching material 38 having the refractive index approximately equal to that of the optical waveguides 61–63. For this reason, the optical axes of the respective optical paths 56–58 substantially agree with the optical axes 66–68 of the optical waveguides 61–63, respectively.

As shown in FIG. 8, the optical path 58 and the optical waveguide 63 are arranged so that when the light 44 emerging along the optical axis 67 from the optical waveguide 62 is reflected by the second planar portion 21c, they receive the light 44 along the optical axis 68. Therefore, the light 44 reflected by the second planar portion 21c travels on the optical path 58 to enter the optical waveguide 63, and propagates in the optical waveguide 63. This can prevent the light from the optical waveguide 62 reflected by the second planar portion 21c from being coupled with another optical device in an optical system incorporating the variable optical attenuator 200.

As shown in FIG. 8, when the signal light 46 from the optical waveguide 61 is reflected by the second planar portion 21c, it travels off the optical path 57 to the side of the optical waveguide 62. If another optical waveguide exists beside the optical waveguide 62, the signal light 46 may be coupled with the optical waveguide. Where the signal light propagates in the optical waveguide, this optical coupling can cause crosstalk. In order to prevent the crosstalk, it is preferable to transmit the signal light from the optical waveguide 62 to the optical waveguide 61. In this case, light emerging from the end face 61a of the optical waveguide 61 is light at low intensity mainly reflected by an external optical device. Consequently, the crosstalk can be satisfactorily suppressed. This also applies to the variable optical attenuator of the first embodiment.

Third Embodiment

Figure 9:
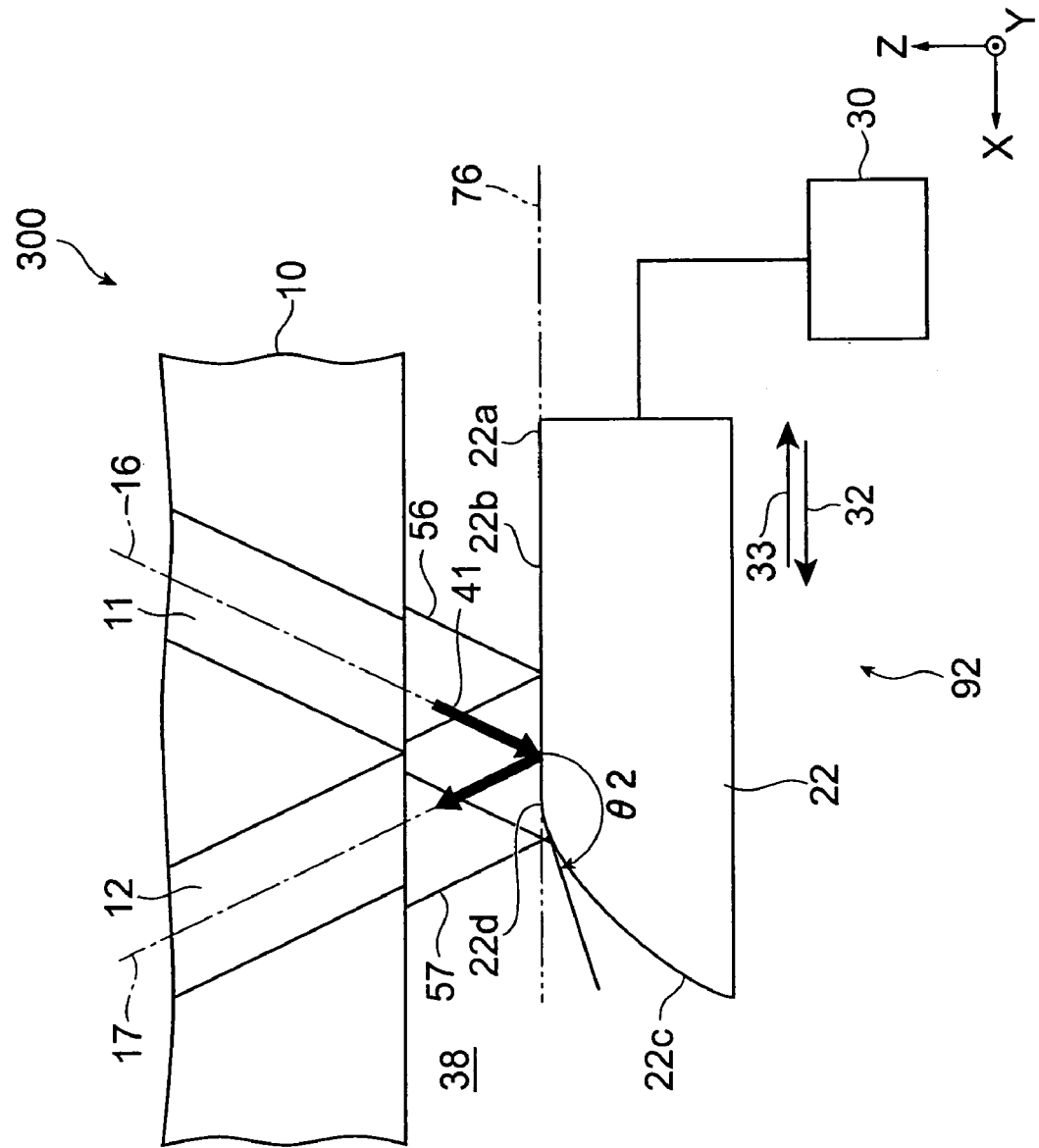
FIG. 9 is a schematic plan view showing a variable optical attenuator of a third embodiment.

FIG. 9 is a schematic plan view showing a variable optical attenuator 300 in the third embodiment. The variable optical attenuator 300 has a movable mirror 22 instead of the movable mirror 21 in the variable optical attenuator 100 of the first embodiment. The mirror 22 and mirror driver device 30 constitute a movable reflector 92. The other structure of the variable optical attenuator 300 is the same as in the first embodiment.

The movable mirror 22 is an optical reflector having a light reflecting surface 22a. The movable mirror 22 is a prism extending perpendicularly to the plane of FIG. 9, and has a uniform cross section along the direction normal to the plane of FIG. 9. The light reflecting surface 22a has an extremely high reflectance (e.g., 90% or more) for light of a predetermined wavelength propagating in the optical waveguides 11 and 12. The light reflecting surface 22a faces the end faces 11a and 12a of the optical waveguides 11 and 12. The clearance between the light reflecting surface 22a and the end faces 11a and 12a may be filled with the index matching material 38.

Unlike the light reflecting surface 21a in the first embodiment, the light reflecting surface 22a includes a planar portion 22b and a curved portion 22c connected to each other. The connection (boundary) between the planar portion 22b and the curved portion 22c forms an edge 22d. The planar portion 22b, curved portion 22c, and edge 22d all extend perpendicularly to the plane of FIG. 9. The planar portion 22b is parallel to the end faces 11a and 12a of the optical waveguides 11 and 12. The planar portion 22b and planes tangent to the curved portion 22c form angles that monotonically vary with their distance from the planar portion 22b. The tangent plane of the curved portion 22c at the edge 22d forms an angle of θ2 in clockwise rotation from the planar portion 22b. In the present embodiment, $175° \leq θ2 < 180°$.

The mirror driver device 30 moves the movable mirror 22 in directions nearly parallel to the end faces 11a and 12a of the optical waveguides 11 and 12, as indicated by arrows 32 and 33. In accordance therewith, the light reflecting surface 22a of the movable mirror 22 moves along a movement path 76. The connection between the planar portion 22b and the curved portion 22c is movable across the optical axes 16 and 17 of the optical paths 56 and 57. Light emerging from the optical waveguides 11 and 12 is reflected by the planar portion 22b or by the curved portion 22c in accordance with the location of the light reflecting surface 22a.

Just as the planar portion 21b in the first embodiment does, the planar portion 22b receives the light 41 emerging along the optical axis 16 from the optical waveguide 11 and propagating on the optical path 56 and then reflects the light 41 along the optical axis 17 to the optical path 57. In consequence, the light 41 from the optical waveguide 11 is incident along the optical axis 17 into the optical waveguide 12. Therefore, when the light from the optical waveguide 11 is reflected by the planar portion 22b, the coupling efficiency from the optical path 56 to the optical path 57 and the coupling efficiency from the optical waveguide 11 to the optical waveguide 12 are high. On the other hand, when the curved portion 22c receives the light 41, it reflects the light 41 into directions deviated from the optical axis 17. This decreases the coupling efficiency from the optical path 56 to the optical path 57 and the coupling efficiency from the optical waveguide 11 to the optical waveguide 12. Therefore, as in the first embodiment, the variable optical attenuator 300 can continuously change the power of light propagating in the path from the optical waveguide 11 to the optical waveguide 12, or in the reverse path, according to the movement of the light reflecting surface 22a.

Just as in the first embodiment, in the present embodiment the angle θ2 of the edge 22d of the movable mirror 22 is large enough to reduce the light emerging from the optical waveguide 11 and then returning to the optical waveguide 11. For this reason, the variable optical attenuator 300 suitably operates even if the isolator for blocking the optical feedback is not connected to the optical waveguide 11. Therefore, it is feasible to readily and inexpensively construct an optical system incorporating the variable optical attenuator 300.

Fourth Embodiment

Figure 10:
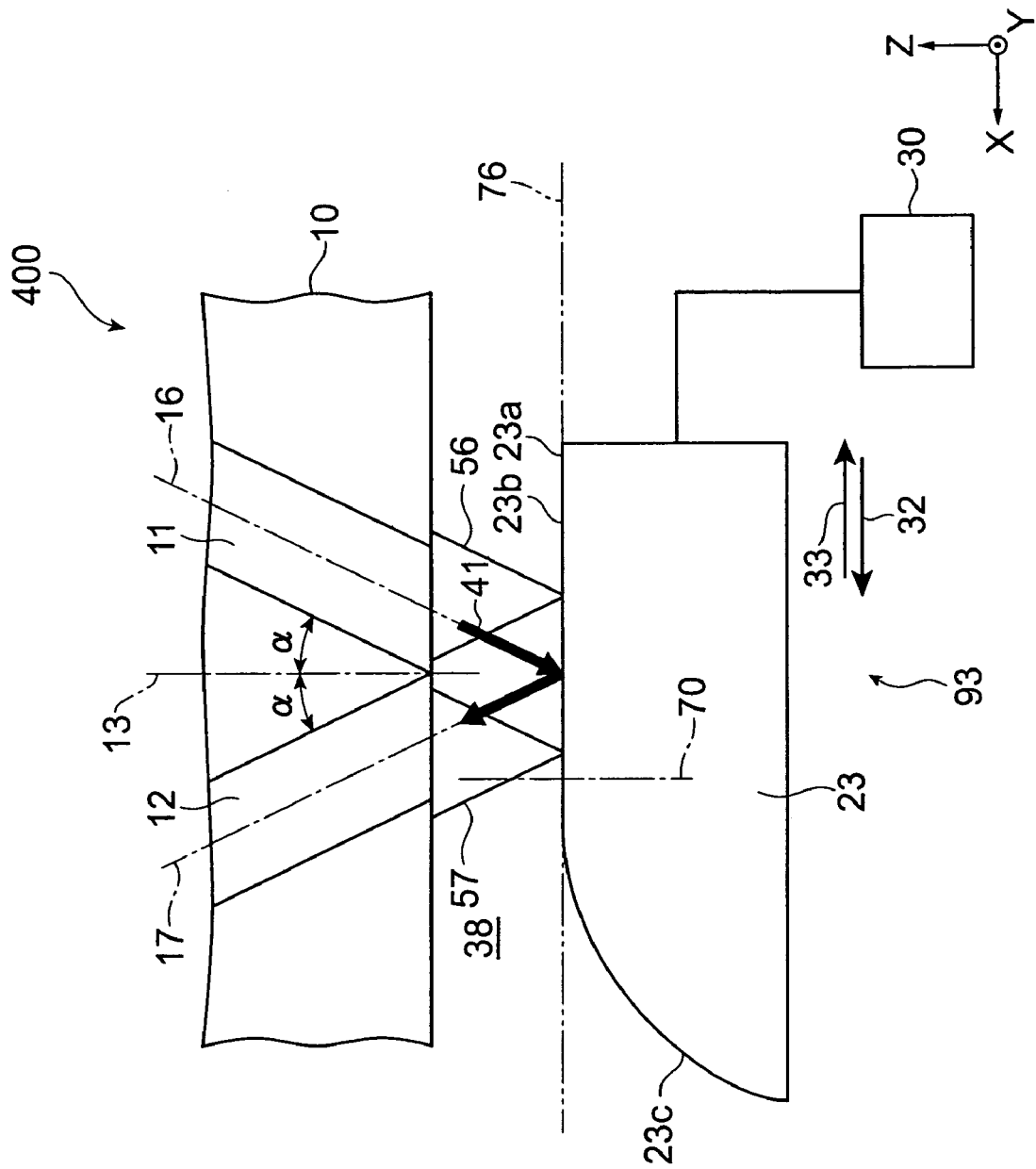
FIG. 10 is a schematic plan view showing a variable optical attenuator of a fourth embodiment.

FIG. 10 is a schematic plan view showing a variable optical attenuator 400 in the fourth embodiment. The variable optical attenuator 400 has a movable mirror 23 instead of the movable mirror 22 in the variable optical attenuator 300 of the third embodiment. The mirror 23 and mirror driver device 30 constitute a movable reflector 93. The other structure of the variable optical attenuator 400 is the same as in the third embodiment.

The movable mirror 23 is an optical reflector having a light reflecting surface 23a. The movable mirror 23 is a prism extending perpendicularly to the plane of FIG. 10, and has a uniform cross section along the direction normal to the plane of FIG. 10. The light reflecting surface 23a has an extremely high reflectance (e.g., 90% or more) for light of the predetermined wavelength propagating in the optical waveguides 11 and 12. The light reflecting surface 23a faces the end faces 11a and 12a of the optical waveguides 11 and 12. The clearance between the light reflecting surface 23a and the end faces 11a and 12a may be filled with the index matching material 38.

As the light reflecting surface 22a in the third embodiment was, the light reflecting surface 23a includes a planar portion 23b and a curved portion 23c connected to each other. However, different from the third embodiment, the connection (boundary) between the planar portion 23b and the curved portion 23c forms no edge. In other words, a tangent plane at an end, which is connected to the planar portion 23b, of the curved portion 23c forms an angle of 180° in clockwise rotation from the planar portion 23b. Hence, the planar portion 23b and the curved portion 23c are smoothly connected on a boundary plane 70 perpendicular to the plane of FIG. 10. Both the planar portion 23b and the curved portion 23c extend perpendicularly to the plane of FIG. 10. The planar portion 23b is parallel to the end faces 11a and 12a of the optical waveguides 11 and 12. The planar portion 23b and planes tangent to the curved portion 23c form angles that vary monotonically with their distance from the planar portion 23b.

The mirror driver device 30 moves the movable mirror 23 in directions nearly parallel to the end faces 11a and 12a of the optical waveguides 11 and 12, as indicated by arrows 32 and 33. In accordance therewith, the light reflecting surface 23a of the movable mirror 23 moves along the movement path 76. The connection between the planar portion 23b and the curved portion 23c is movable across the optical axes 16 and 17 of the optical paths 56 and 57. The light emerging from the optical waveguides 11 and 12 is reflected by the planar portion 23b or by the curved portion 23c in accordance with the location of the light reflecting surface 23a.

Figure 11:
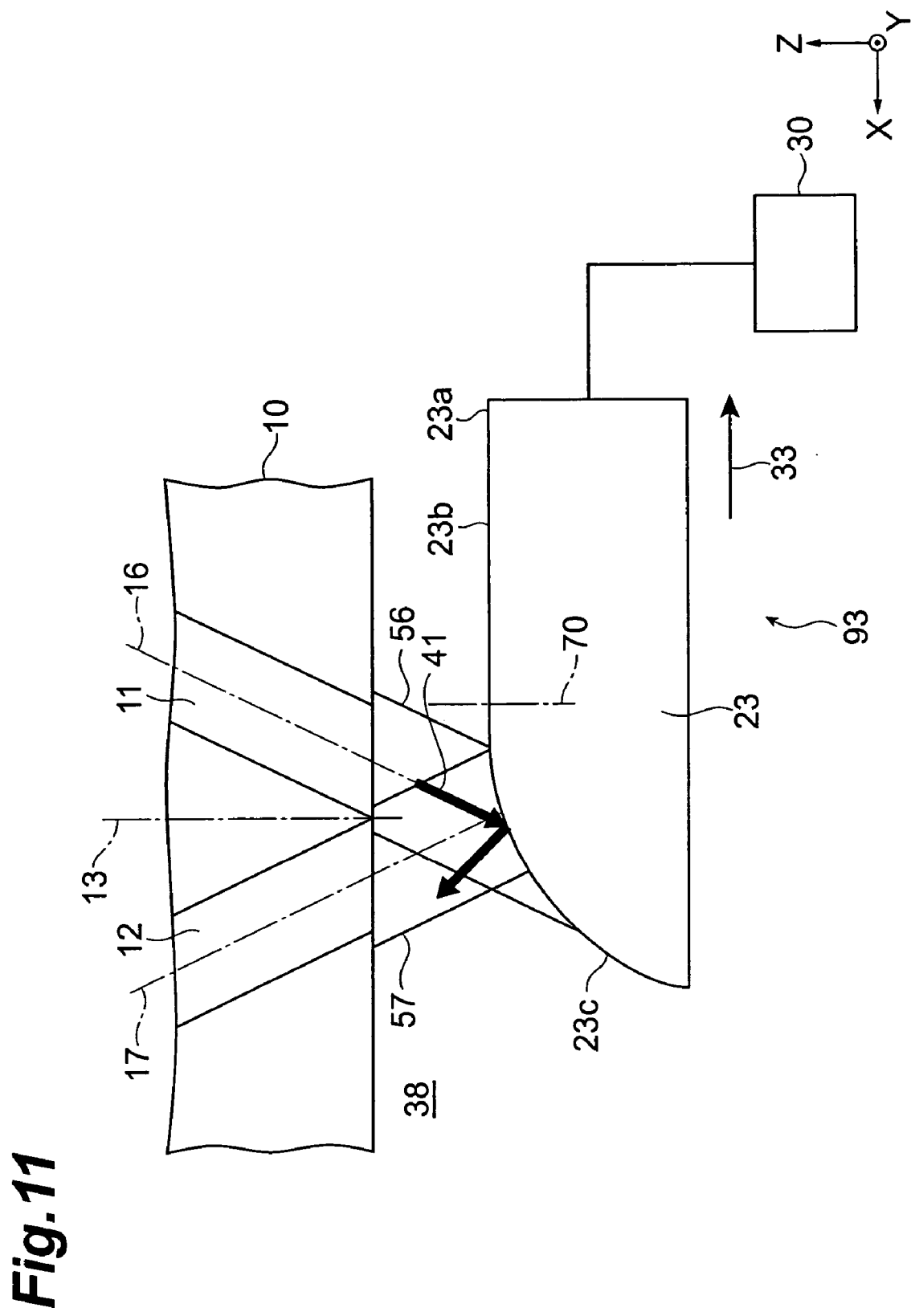
FIG. 11 is a schematic plan view showing reflection of light by a curved portion of a movable mirror.

FIG. 10 shows reflection of the light 41 emerging from the optical waveguide 11 along the optical axis 16 by the planar portion 23b. When the movable mirror 23 is placed at the location shown in FIG. 10, the light 41 emerging from the optical waveguide 11 travels on the optical path 56 toward the mirror 23 and then impinges on the planar portion 23b. When the planar portion 23b receives the light 41 from the optical path 56, it reflects the light 41 toward the optical path 57 along the optical axis 17. In consequence, the light 41 from the optical waveguide 11 is incident along the optical axis 17 into the optical waveguide 12. Therefore, when the light from the optical waveguide 11 is reflected by the planar portion 23b, the coupling efficiency from the optical waveguide 11 to the optical waveguide 12 is high. As the movable mirror 23 moves in the direction indicated by the arrow 33, as shown in FIG. 11, the light 41 comes to be reflected by the curved portion 23c. The curved portion 23c reflects the light 41 into directions deviated from the optical axis 17. This decreases the coupling efficiency from the optical path 56 to the optical path 57, and correspondingly the coupling efficiency from the optical waveguide 11 to the optical waveguide 12. Therefore, as in the first embodiment, the variable optical attenuator 400 can continuously change the power of light propagating in the path from the optical waveguide 11 to the optical waveguide 12, or in the reverse path, according to the movement of the light reflecting surface 23a.

An example in which the curved portion 23c is a cylindrical surface will be described below. In this example, the light transmitted by the optical waveguides 11 and 12 has the wavelength of 1.55 µm, and the Gaussian distribution with the Mode Field Diameter (MFD) of 20 µm. The radius of curvature of the curved portion 23c is 400 µm, and the angle 2α between the optical waveguides 11 and 12 is 10°. The clearance between the end faces 11a and 12a of the optical waveguides 11 and 12 and the light reflecting surface 23a is filled with the index matching material 38 having the refractive index of 1.45.

Figure 12:
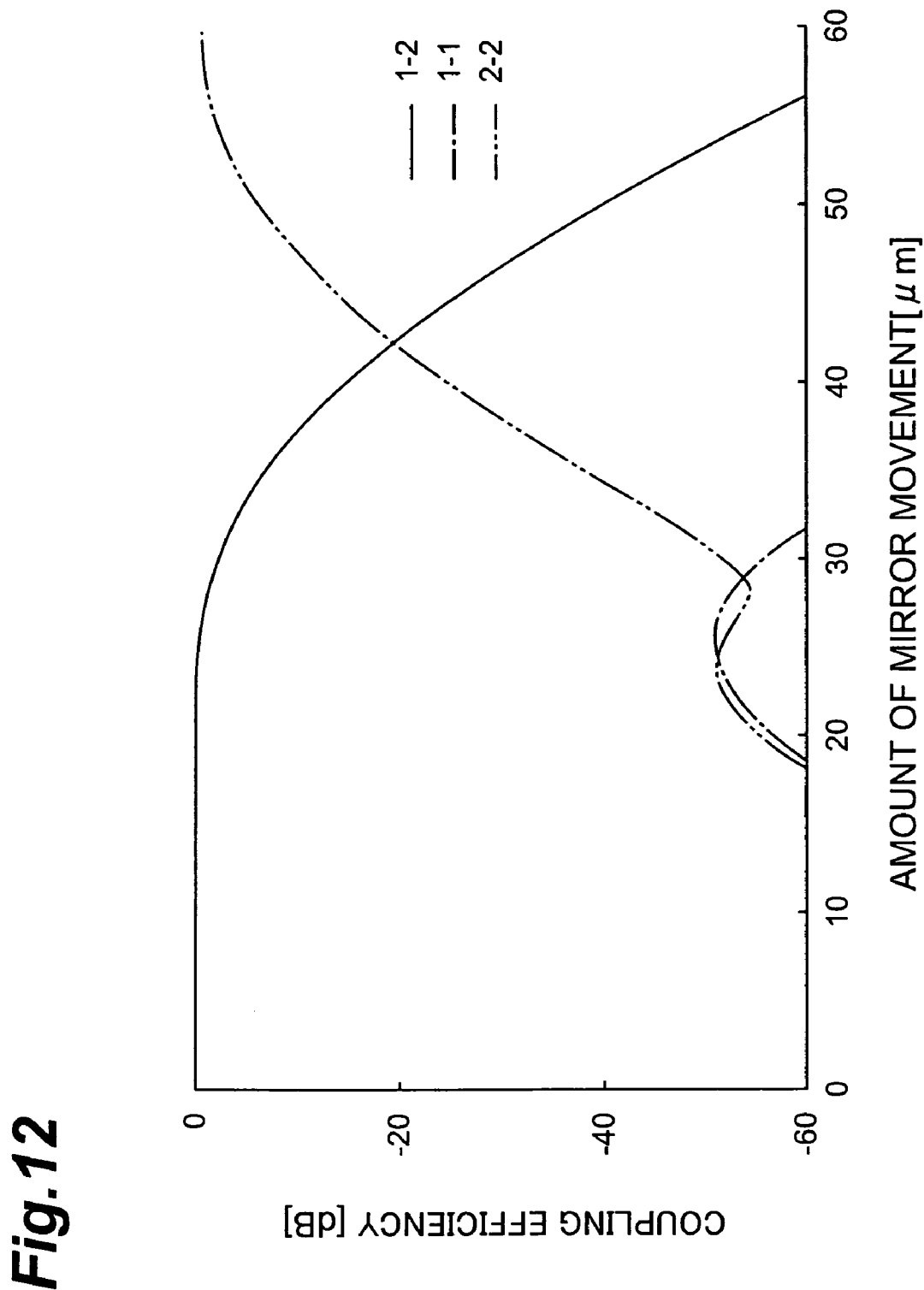
FIG. 12 is a diagram showing a relationship between the amount of the movement of a movable mirror and the coupling efficiency.

FIG. 12 shows a relationship between the movement amount of the movable mirror 23 and the coupling efficiency between the optical waveguides 11 and 12. The "MIRROR MOVEMENT" on the horizontal axis represents the amount of movement of the movable mirror 23 along the direction indicated by the arrow 33 in FIG. 11. When the mirror movement amount is 25 µm, the boundary plane 70 between the planar portion 23b and the curved portion 23c coincides with the reference plane 13 located midway between the optical waveguides 11 and 12. When the mirror movement amount is less than 25 µm, as shown in FIG. 10, the light from the optical waveguide 11 is reflected mainly by the planar portion 23b. When the mirror movement amount is over 25 µm, as shown in FIG. 11, the light from the optical waveguide 11 is reflected mainly by the curved portion 23c.

Figure 2:
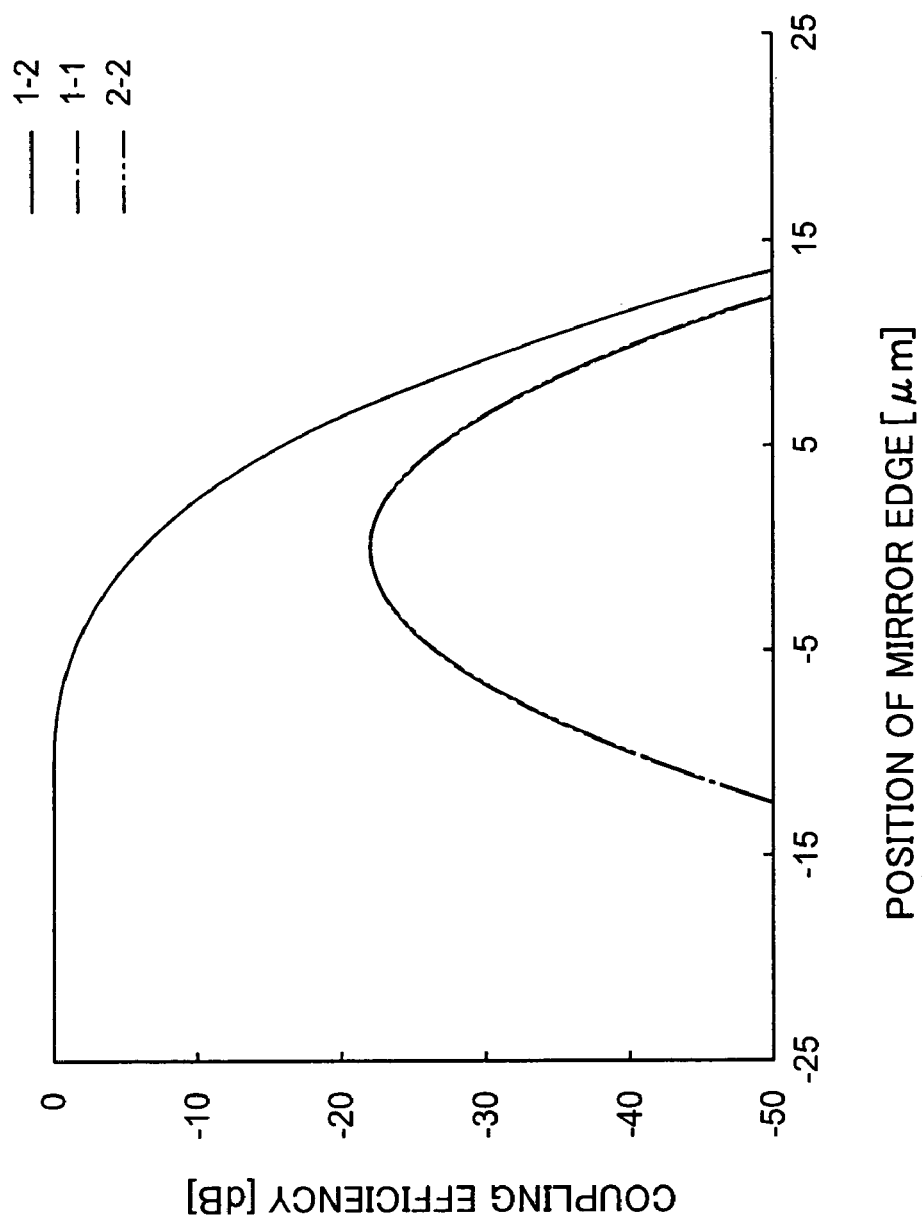
FIG. 2 is a diagram showing a relationship between the location of an edge of a movable mirror and the coupling efficiency.
Figure 3:
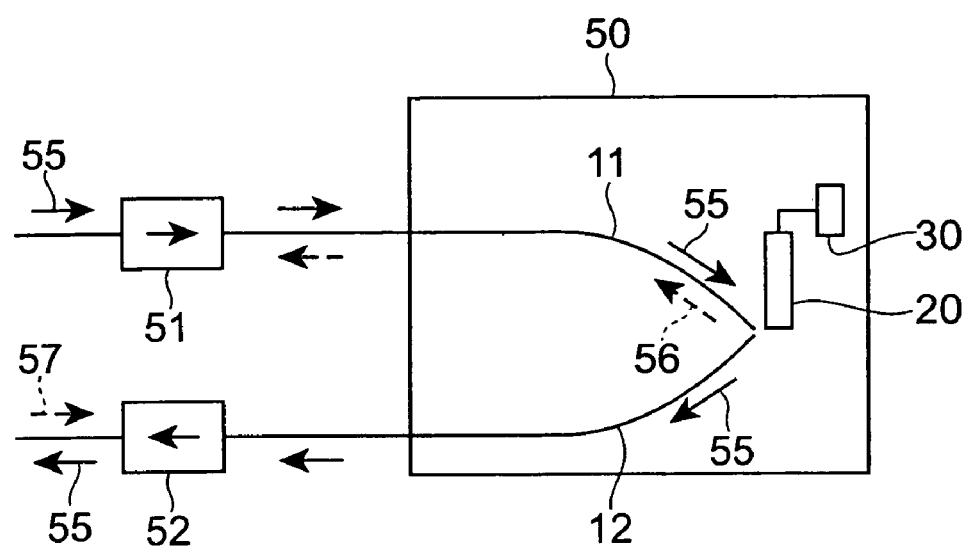
FIG. 3 is a schematic diagram showing a method of reducing optical feedback.

In FIG. 12 a solid line indicates the coupling efficiency of the light traveling from the optical waveguide 11 to the optical waveguide 12, a chain line the coupling efficiency of the light emerging from the optical waveguide 11 and returning to the optical waveguide 11, and a chain double-dashed line the coupling efficiency of the light emerging from the optical waveguide 12 and returning to the optical waveguide 12. As shown in FIG. 12, the coupling efficiency from the optical waveguide 11 to the optical waveguide 12 monotonically decreases as the mirror movement amount increases from about 25 µm. The coupling efficiency of the optical feedback from the optical waveguide 11 to the optical waveguide 11 is at most about −50 dB. In contrast to it, in the case of the variable optical attenuator 50 using the movable mirror 20 without the curved portion, as shown in FIG. 2, the coupling efficiency of the optical feedback to the optical waveguide 11 exceeds −25 dB.

As described above, the variable optical attenuator 400 of the present embodiment is able to significantly reduce the optical feedback to the optical path 56 and to the optical waveguide 11. This is conceivably because the planar portion 23b and the curved portion 23c are smoothly connected with no edge between them. Since the optical feedback to the optical waveguide 11 is sufficiently small, the variable optical attenuator 400 suitably operates even if the isolator for blocking the optical feedback is not connected to the optical waveguide 11. Therefore, it is feasible to readily and inexpensively construct an optical system incorporating the variable optical attenuator 400.

Figure 13:
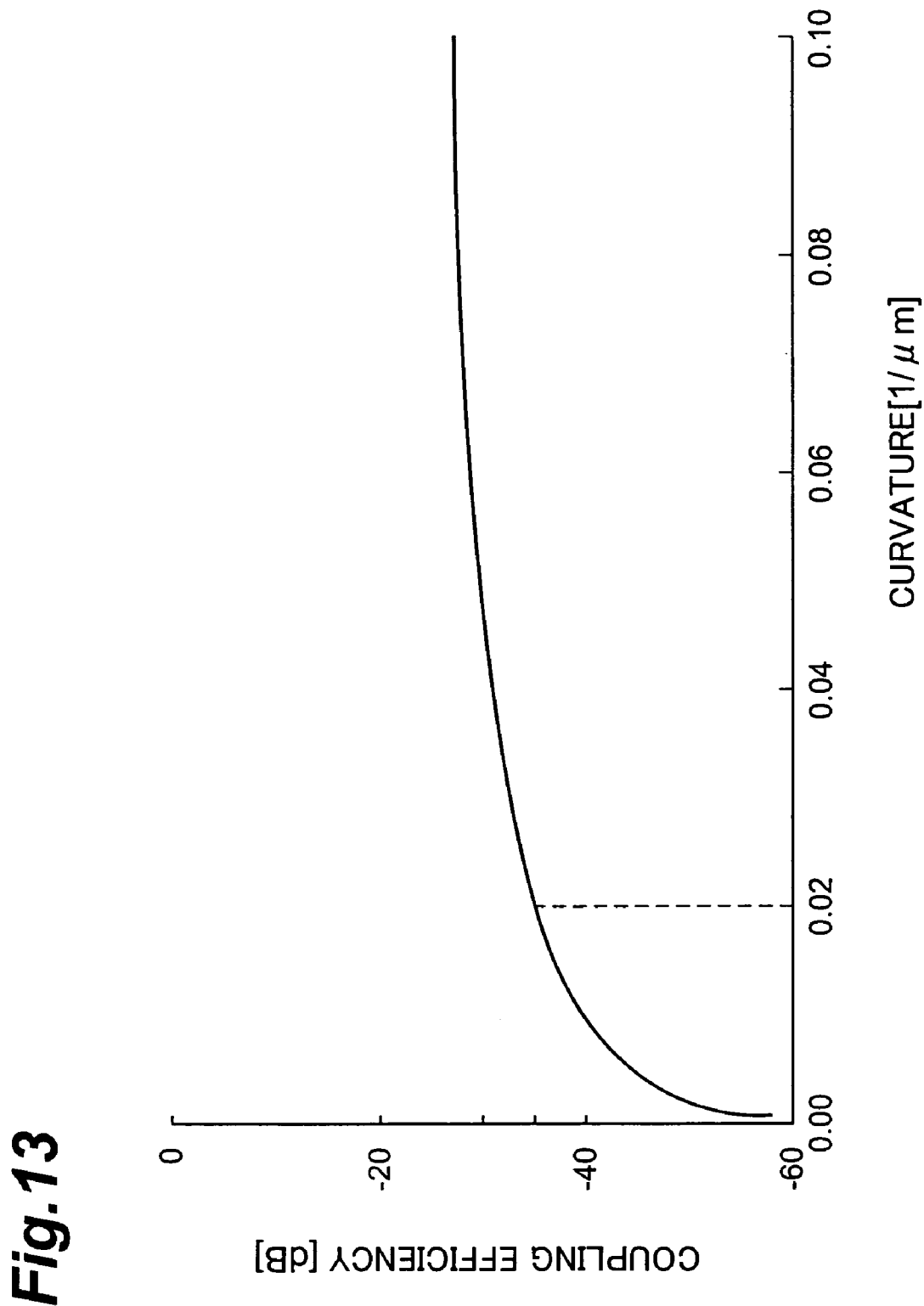
FIG. 13 is a diagram showing a relationship between the curvature of a curved portion and the coupling efficiency of optical feedback.

The preferred curvature of the curved portion 23c will be discussed below where the curved portion 23c is a cylindrical surface. FIG. 13 is a graph showing a relationship between the curvature of the curved portion 23c of the cylindrical surface and the coupling efficiency of the optical feedback from the optical waveguide 11 to the optical waveguide 11. FIG. 14 is a table showing typical values on the graph of FIG. 13, where "OFB" represents the quantity of the optical feedback, "CUR" the curvature of the curved portion, and "ROC" the radius of curvature of the curved portion. Here the wavelength, the MFD, the angle between the waveguides 11 and 12, and the refractive index of the index matching material are the same as in the case of FIG. 12, and are 1.55 µm, 20 µm, 10°, and 1.45, respectively. As shown in FIG. 13, the coupling efficiency of the optical feedback drastically drops in the region where the curvature of the curved portion 23c is not more than 0.02/µm. Therefore, the radius of curvature of the curved portion 23c is preferably not less than the reciprocal of the curvature of 0.02/µm, i.e., not less than 50 µm.

The relationship between the radius of curvature of the curved portion 23c and the coupling efficiency of the optical feedback varies according to the wavelength, the MFD, the angle between optical waveguides, and the refractive index of the clearance between the optical waveguides and the movable mirror. The minimum curvature radius to achieve sufficient feedback reducing effect is inversely proportional to the wavelength, is proportional to the square of the MFD, and is proportional to the refractive index of the clearance between the optical waveguides and the movable mirror. For example, where the MFD is half of that in the above example, i.e., 10 µm, the minimum curvature radius for reduction of optical feedback is a quarter of 50 µm, i.e., 12.5 µm. In this case, the radius of curvature of the curved portion 23c is preferably 12.5 µm or more.

Figure 15:
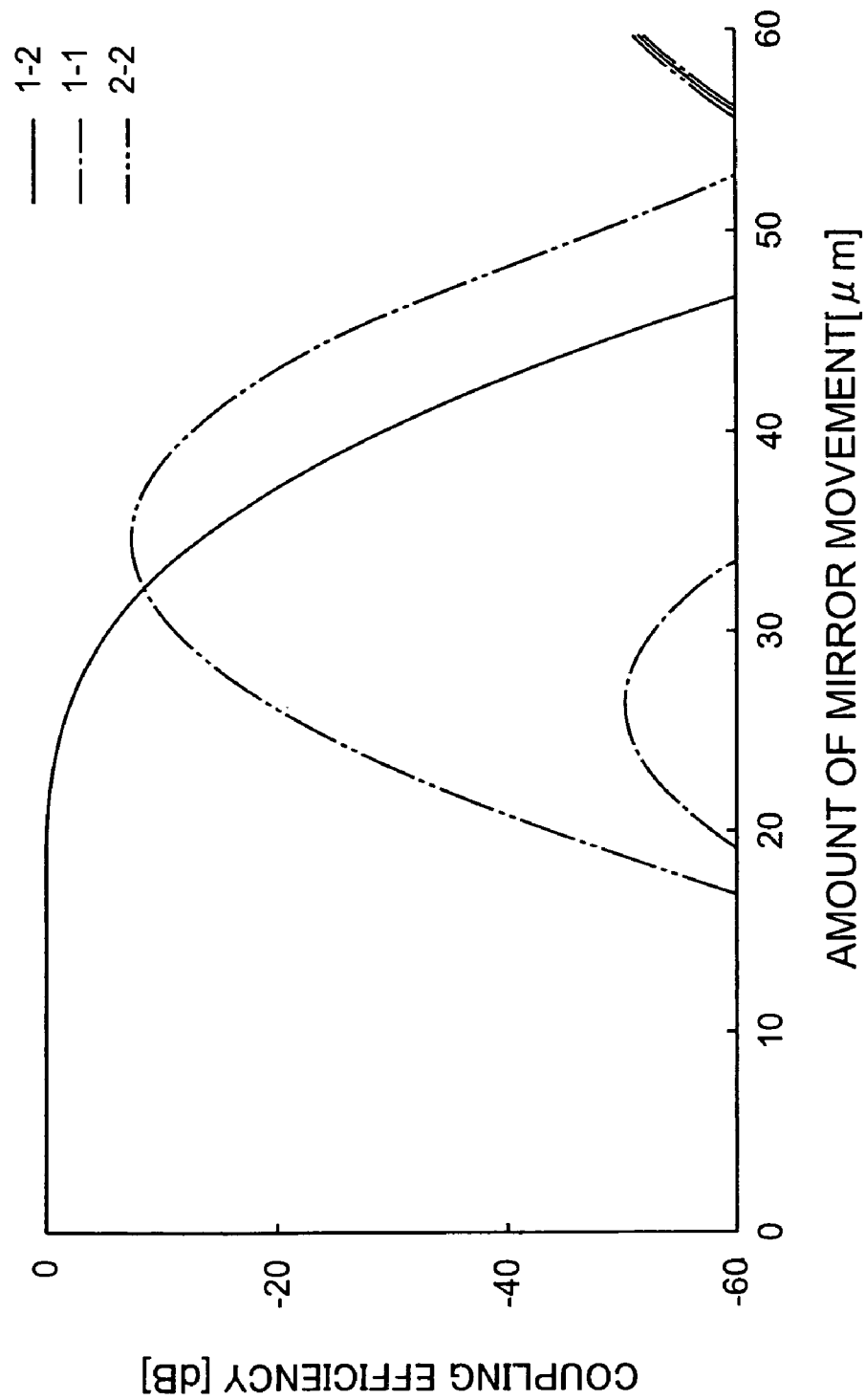
FIG. 15 is a diagram showing a relationship between the amount of the movement of a movable mirror and the coupling efficiency.
Figure 16:
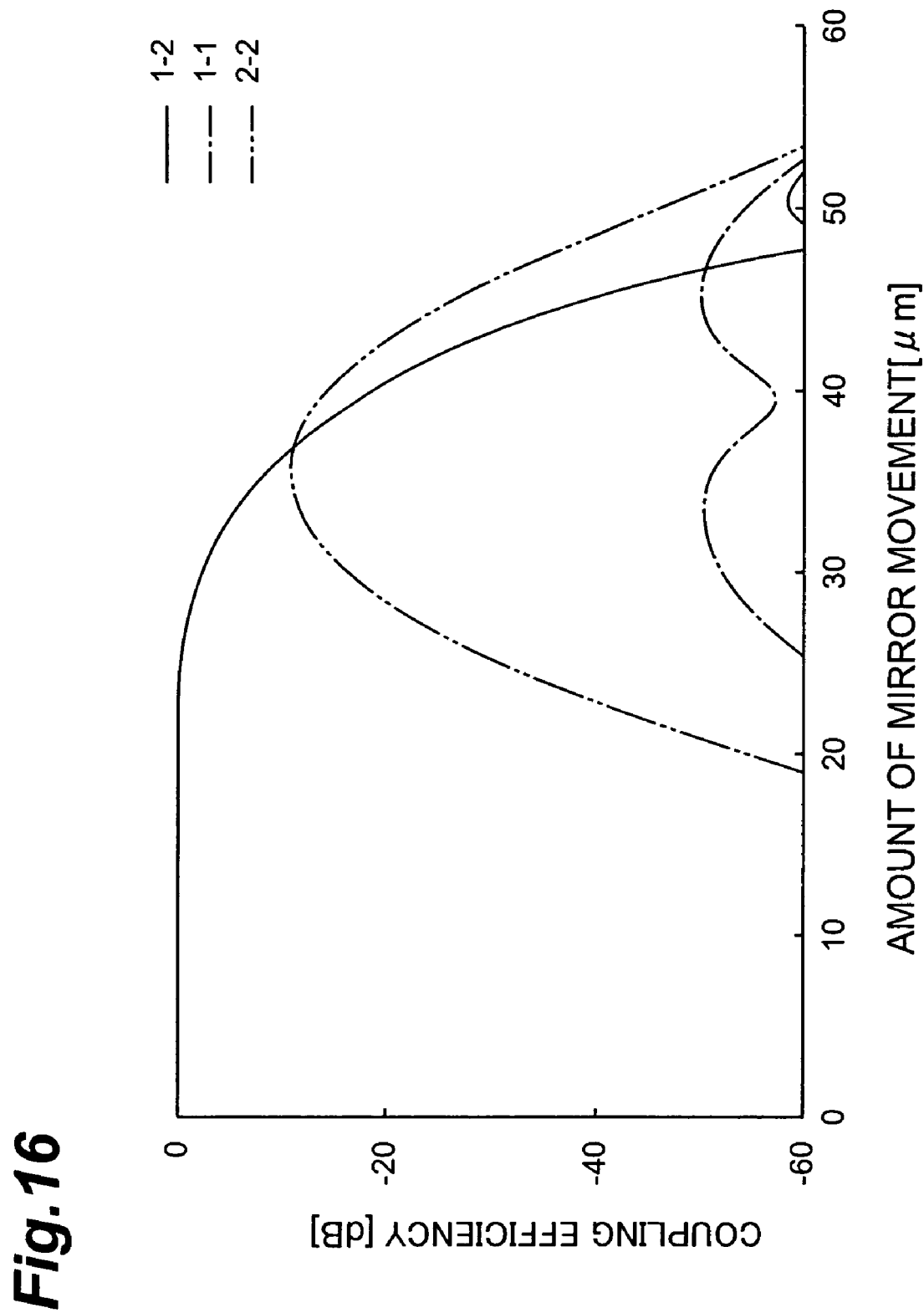
FIG. 16 is a diagram showing a relationship between the movement of the amount of a movable mirror and the coupling efficiency.

The curved portion 23c does not always have to be a cylindrical surface. FIG. 15 shows a relationship between the mirror movement amount and the coupling efficiency where the shape of the curved portion 23c is expressed by a cubic function of $y=0.0003 \times x^3$. FIG. 16 shows a relationship between the mirror movement amount and the coupling efficiency where the shape of the curved portion 23c is expressed by a sextic function of $y=10^{-7} \times x^6$. Here the origin of the xy coordinates is located at the boundary between the curved portion 23c and the planar portion 23b, the x-axis is parallel to the planar portion 23b, and the y-axis is normal to the planar portion 23b. Units of x and y are µm. The other conditions are the same as in the above example.

In FIGS. 15 and 16 a solid line indicates the coupling efficiency of the light traveling from the optical waveguide 11 to the optical waveguide 12, a chain line the coupling efficiency of the light emerging from the optical waveguide 11 and returning to the optical waveguide 11, and a chain double-dashed line the coupling efficiency of the light emerging from the optical waveguide 12 and returning to the optical waveguide 12. As seen from these figures, the optical feedback to the optical waveguide 11 is fully reduced even in cases where the curved portion 23c is not a cylindrical surface.

If the radius of curvature of the curved portion 23c is too small, the optical feedback due to diffraction will increase. An appropriate radius of curvature is determined according to the wavelength and divergence of light, the angle between waveguides, and so on.

Fifth Embodiment

Figure 17:
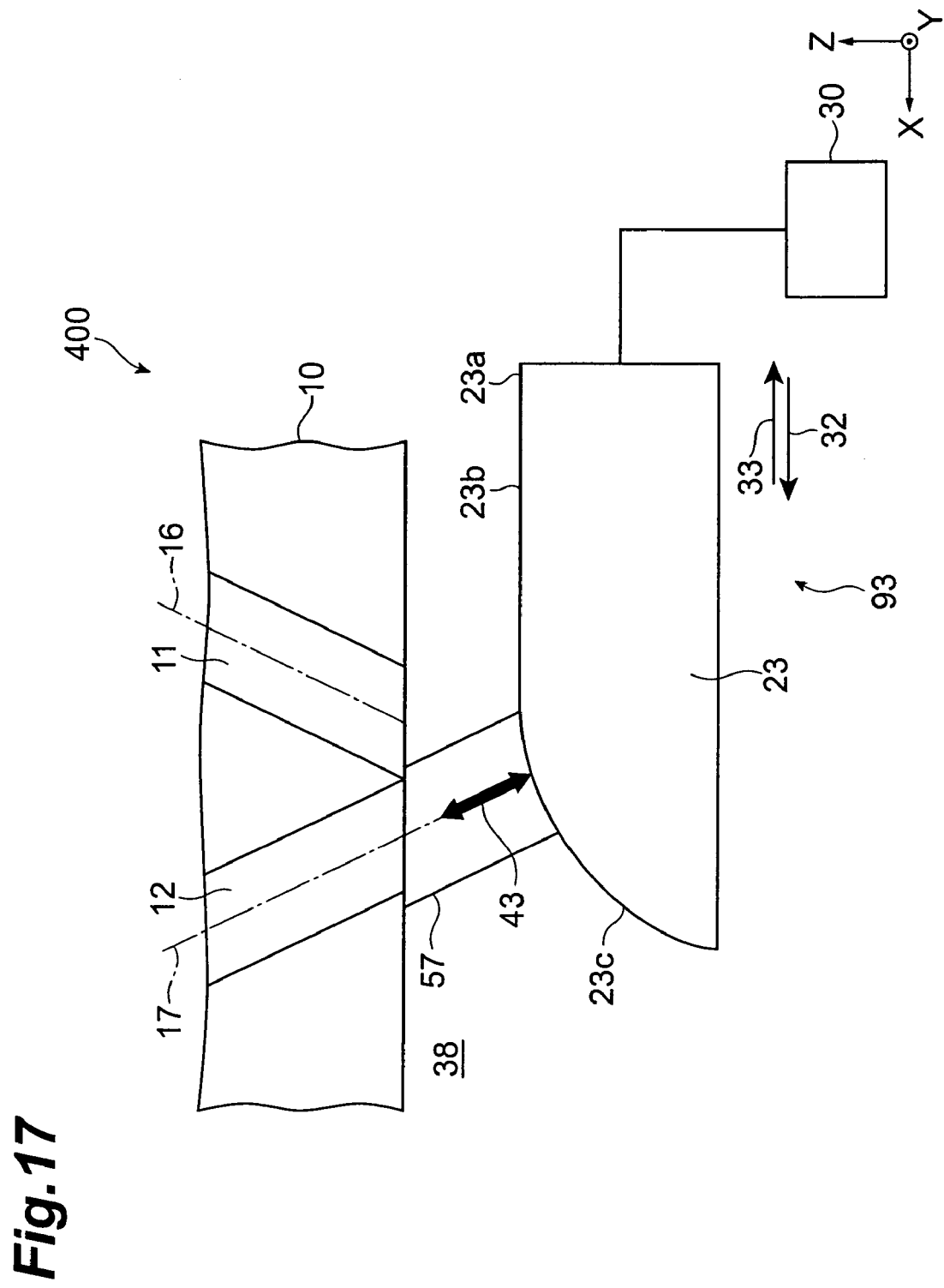
FIG. 17 is a schematic plan view showing reflection of light by a curved portion of a movable mirror.

In the foregoing embodiments the optical feedback from the optical waveguide 11 to the optical waveguide 11 is reduced well, but the reduction of the optical feedback from the optical waveguide 12 to the optical waveguide 12 is not enough. As shown in FIG. 17, when the light 43 emerging along the optical axis 17 from the optical waveguide 12 and propagating on the optical path 57 is reflected by the curved portion 23c, it is likely to return to the optical path 57 and to the optical waveguide 12. Therefore, the fifth embodiment of the present invention presents a variable optical attenuator 500 capable of also reducing the optical feedback to the optical path 57 and to the optical waveguide 12 as well as the optical feedback to the optical path 56 and to the optical waveguide 11.

Figure 18:
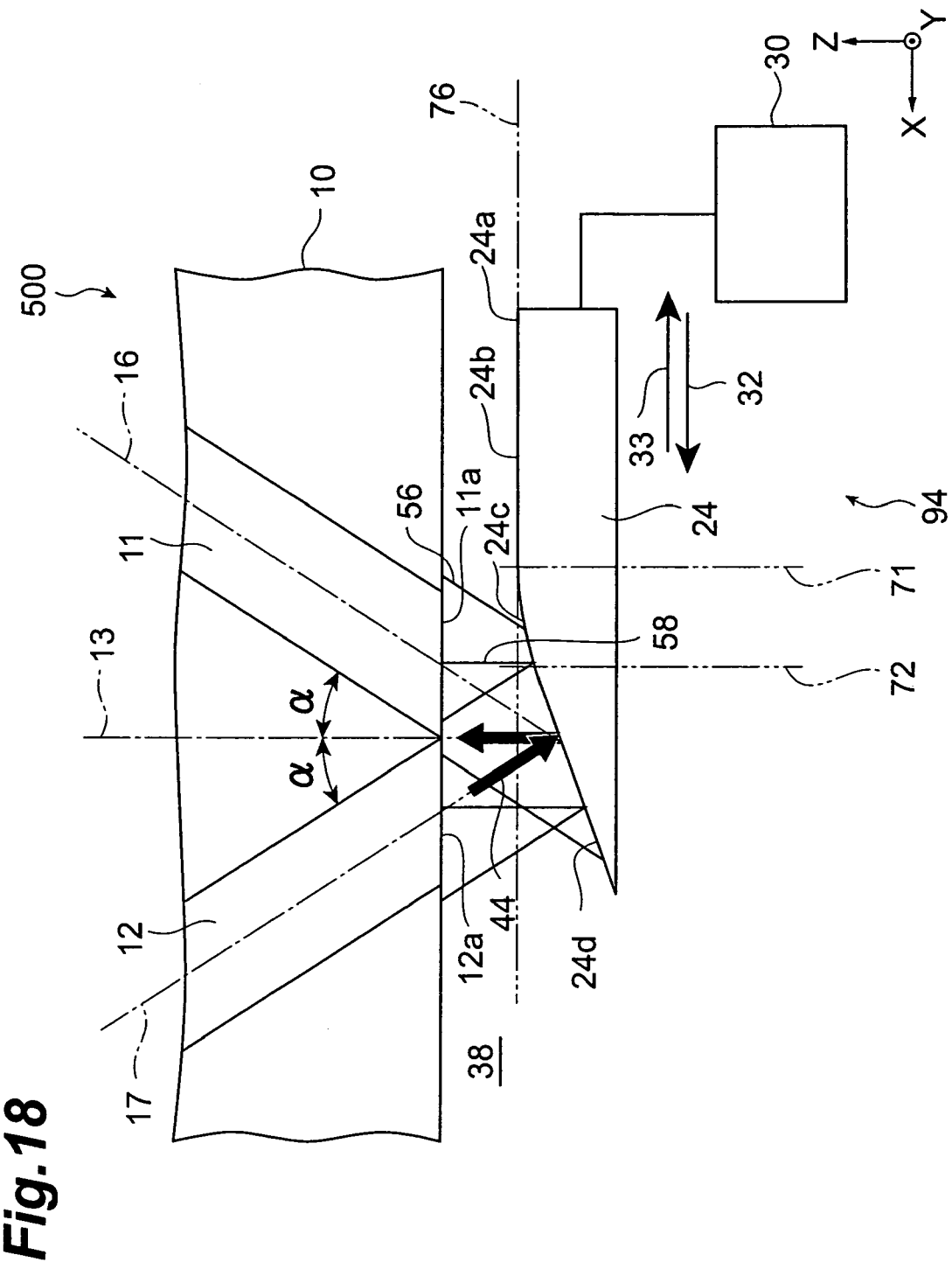
FIG. 18 is a schematic plan view showing a variable optical attenuator in the fifth embodiment.

FIG. 18 is a schematic plan view showing the variable optical attenuator 500 in the fifth embodiment. The variable optical attenuator 500 has a movable mirror 24 instead of the movable mirror 23 in the variable optical attenuator 400 in the fourth embodiment. The mirror 24 and mirror driver device 30 constitute a movable reflector 94. The other structure of the variable optical attenuator 500 is much the same as in the fourth embodiment.

The movable mirror 24 is an optical reflector having a light reflecting surface 24a. The movable mirror 24 is a prism extending perpendicularly to the plane of FIG. 18, and has a uniform cross section along the direction normal to the plane of FIG. 18. The light reflecting surface 24a has an extremely high reflectance (e.g., 90% or more) for light of the predetermined wavelength propagating in the optical waveguides 11 and 12. The light reflecting surface 24a faces the end faces 11a and 12a of the optical waveguides 11 and 12. The clearance between the light reflecting surface 24a and the end faces 11a and 12a may be filled with the index matching material 38.

The light reflecting surface 24a has a second planar portion 24d in addition to the first planar portion 24b and the curved portion 24c. The first planar portion 24b, curved portion 24c, and second planar portion 24d all extend perpendicularly to the plane of FIG. 18. The first planar portion 24b is parallel to the end faces 11a and 12a of the optical waveguides 11 and 12. As the planar portions in the above embodiments do, the planar portion 24b reflects the light emerging along the optical axis 16 of the optical waveguide 11 from the optical waveguide 11 into the direction along the optical axis 17 of the optical waveguide 12. As in the fourth embodiment, an end of the curved portion 24c is smoothly connected to the planar portion 24b on a boundary plane 71 perpendicular to the plane of FIG. 18. The end of the curved portion 24c on the side away from the first planar portion 24b is smoothly connected to the second planar portion 24d on a boundary plane 72 perpendicular to the plane of FIG. 18. The first planar portion 24b and planes tangent to the curved portion 24c form angles that vary monotonically with their distance from the first planar portion 24b.

The mirror driver device 30 moves the movable mirror 24 in directions nearly parallel to the end faces 11a and 12a of the optical waveguides 11 and 12, as indicated by arrows 32 and 33. In accordance therewith, the light reflecting surface 24a of the movable mirror 24 moves along the movement path 76. The connection between the first planar portion 24b and the curved portion 24c is movable across the optical axes 16 and 17 of the optical paths 56 and 57. The connection between the curved portion 24c and the second planar portion 24d is also movable across the optical axes 16 and 17 of the optical paths 56 and 57. The light emerging from the optical waveguides 11 and 12 is reflected by the first planar portion 24b, by the curved portion 24c, or by the second planar portion 24d in accordance with the location of the light reflecting surface 24a. As in the fourth embodiment, the variable optical attenuator 500 can continuously change the power of the light propagating in the path from the optical waveguide 11 and the optical path 56 to the optical waveguide 12 and the optical path 57, or in the reverse path, according to the movement of the light reflecting surface 24a.

The first planar portion 24b reflects light 44 emerging along the optical axis 17 from the optical waveguide 12 and traveling on the optical path 57. In consequence, the light 44 travels on the optical path 56 to enter the optical waveguide 11, and then propagates in the optical waveguide 11. As the movable mirror 24 moves in the direction indicated by the arrow 33, the light 44 comes to be reflected by the curved portion 24c. The direction of reflection of the light 44 by the curved portion 24c approaches the direction along the optical axis 17 from the direction along the optical axis 16 as the location of incidence of the light 44 to the curved-portion 24c moves away from the first planar portion 24b.

As the movable mirror 24 further moves in the direction indicated by the arrow 33, the light 44 comes to be reflected by the second planar portion 24d. The second planar portion 24d reflects the light 44 into a direction located between the direction along the optical axis 16 and the direction along the optical axis 17. This results in fixing the direction of reflection of the light 44. In the present embodiment, as shown in FIG. 18, the light 44 reflected by the second planar portion 24d travels on an optical path 58 along the reference plane 13 located at the center between the optical waveguides 11 and 12.

By this configuration wherein the second planar portion 24d is connected to the curved portion 24c, the variation of the reflecting direction of the light 44 is terminated according to the movement of the light reflecting surface 24a. This prevents the light 44 from being reflected along the optical axis 17. Since the curved portion 24c and the second planar portion 24d reflect the light 44 into the directions deviated from the optical axis 17, the light from the optical waveguide 12 is unlikely to be coupled with the optical waveguide 12. This suppresses the optical feedback from the optical path 57 to the optical path 57 and the optical feedback from the optical waveguide 12 to the optical waveguide 12.

Figure 19:
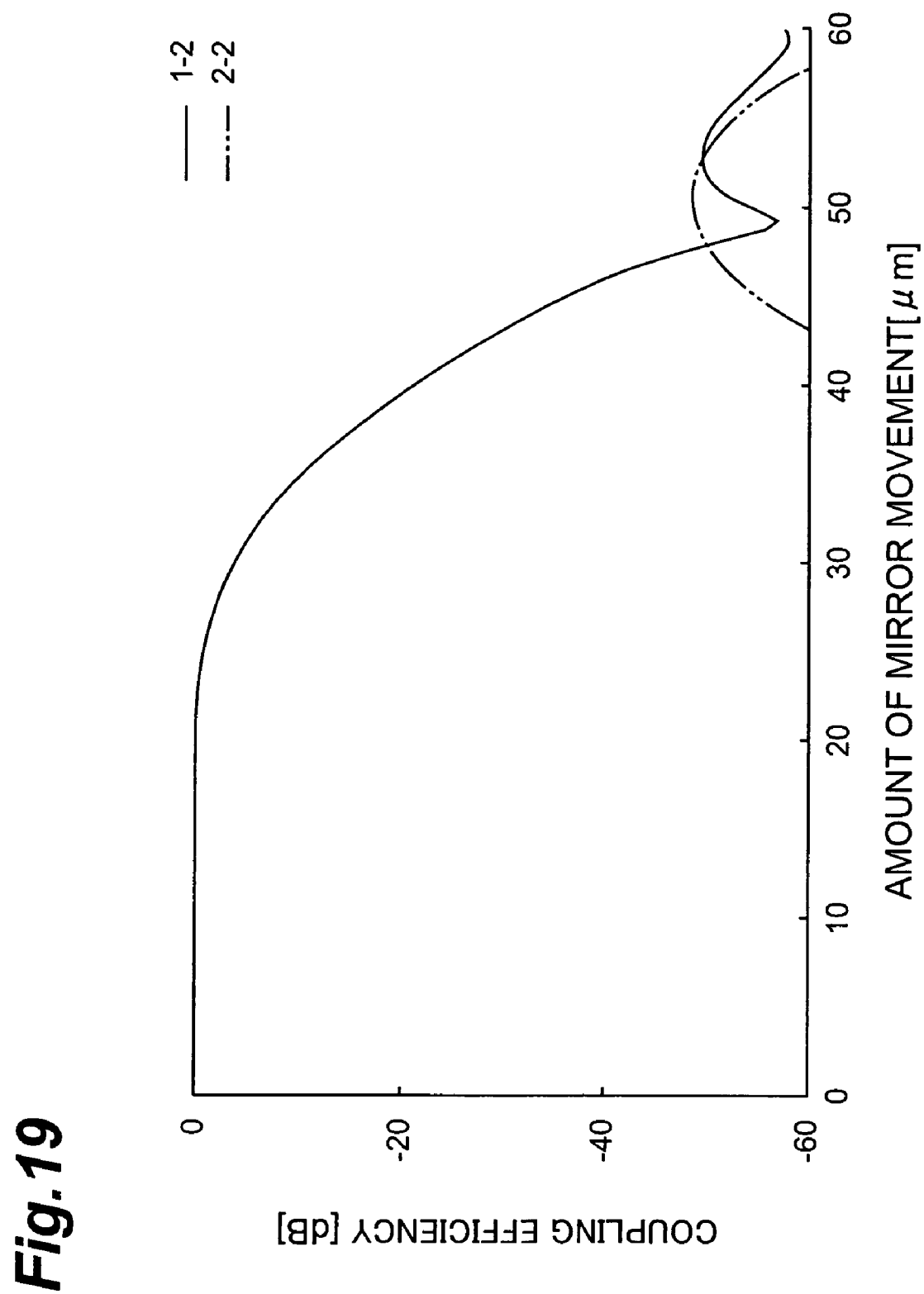
FIG. 19 is a diagram showing a relationship between the amount of the movement of a movable mirror and the coupling efficiency.

FIG. 19 shows a relationship between the movement amount of the movable mirror 24 and the coupling efficiency between the optical waveguides 11 and 12 in an example of the present embodiment. In this example, the curved portion 24c is a cylindrical surface, and the radius of curvature thereof is 300 µm. The light transmitted by the optical waveguides 11 and 12 has the wavelength of 1.55 µm, and the Gaussian distribution with the Mode Field Diameter (MFD) of 20 µm. The angle 2α between the optical waveguides 11 and 12 is 20°. The second planar portion 24d forms an angle of 175° in clockwise rotation from the first planar portion 24b. The clearance between the end faces 11a and 12a of the optical waveguides 11 and 12 and the light reflecting surface 24a is filled with the index matching material 38 having the refractive index of 1.45.

In FIG. 19 a solid line indicates the coupling efficiency of the light traveling from the optical waveguide 11 to the optical waveguide 12, and a chain double-dashed line the coupling efficiency of the light emerging from the optical waveguide 12 and returning to the optical waveguide 12. As shown in FIG. 19, the coupling efficiency of the optical feedback to the optical waveguide 12 is at most about −50 dB. Therefore, the variable optical attenuator 500 in the present embodiment can significantly reduce the optical feedback to the optical waveguide 12. Since the optical feedback to the optical waveguide 12 is small enough, the variable optical attenuator 500 suitably operates even if the isolator for blocking the optical feedback is not connected to the optical waveguide 12. For the same reason as in the fourth embodiment, the variable optical attenuator 500 in the present embodiment can also significantly reduce the optical feedback to the optical path 56 and to the optical waveguide 11. Therefore, there is no need for connecting the isolator to the optical waveguide 11, either. For this reason, it is feasible to extremely readily and inexpensively construct an optical system incorporating the variable optical attenuator 500.

Sixth Embodiment

Figure 20:
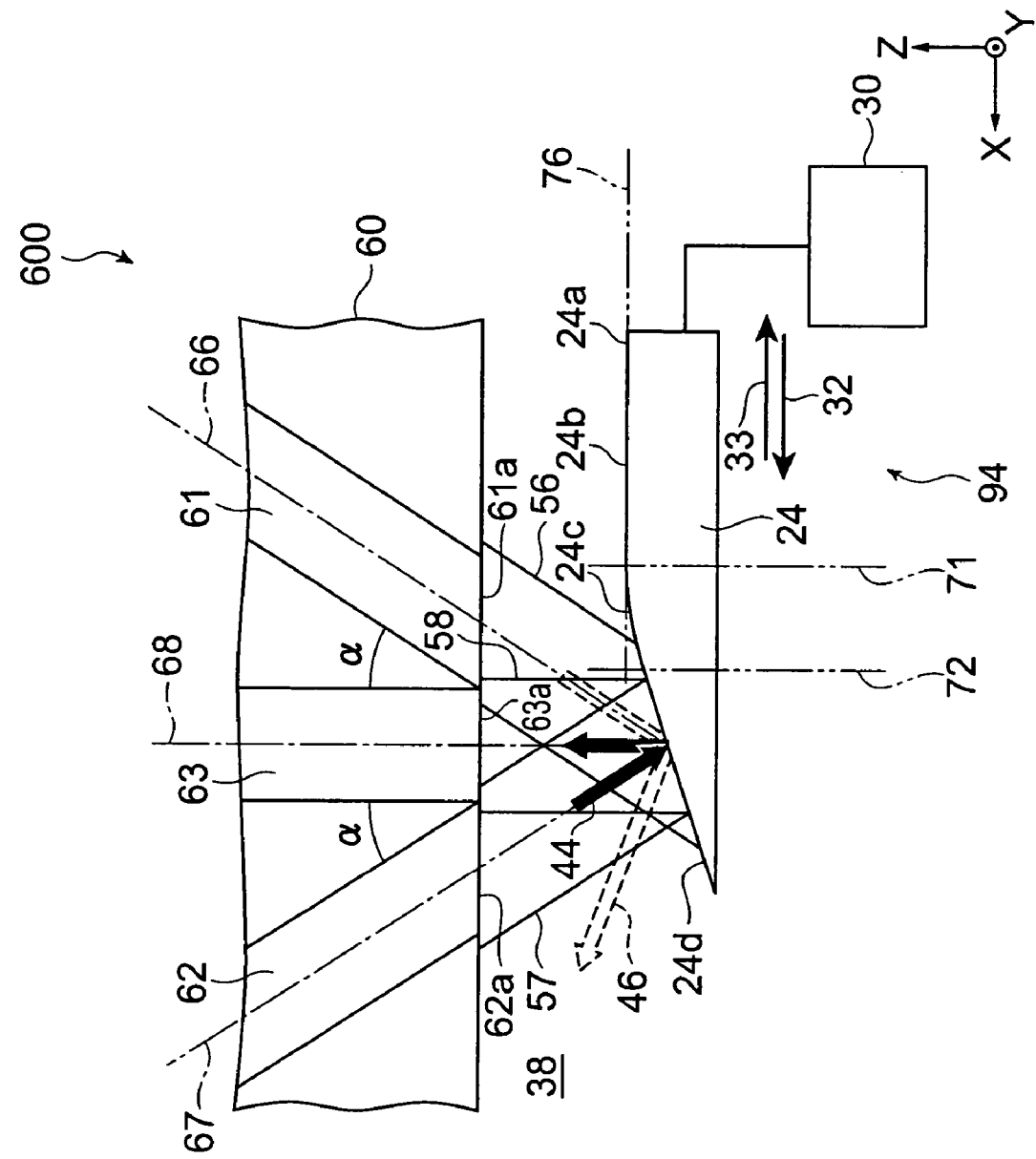
FIG. 20 is a schematic plan view showing a variable optical attenuator of a sixth embodiment.

FIG. 20 is a schematic plan view showing a variable optical attenuator 600 in the Sixth embodiment. The variable optical attenuator 600 has a PLC 60 instead of the PLC 10 in the variable optical attenuator 500 in the fifth embodiment. The other structure of the variable optical attenuator 600 is the same as in the fifth embodiment.

The structure of the PLC 60 is already described in the second embodiment. The variable optical attenuator 600 has optical paths 56–58 each extending between the end faces of the optical waveguides 61–63 and the light reflecting surface 24a. In the present embodiment the clearance between the end faces of the optical waveguides 61–63 and the light reflecting surface 24a is filled with the index matching material 38 having the refractive index approximately equal to that of the optical waveguides 61–63. For this reason, the optical axes of the respective optical paths 56–58 substantially agree with the optical axes 66–68 of the optical waveguides 61–63, respectively.

As shown in FIG. 20, the optical path 58 and the optical waveguide 63 are arranged so that when the light 44 emerging along the optical axis 67 from the optical waveguide 62 is reflected by the second planar portion 24d, they receive the light 44 along the optical axis 68. Therefore, the light 44 reflected by the second planar portion 24d travels on the optical path 58 to enter the optical waveguide 63, and propagates in the optical waveguide 63. This can prevent the light from the optical waveguide 62 reflected by the second planar portion 24d from being coupled with another optical device in an optical system incorporating the variable optical attenuator 600.

As shown in FIG. 20, when the signal light 46 from the optical waveguide 61 is reflected by the second planar portion 24d, it travels off the optical path 57 to the side of the optical waveguide 62. If another optical waveguide exists beside the optical waveguide 62, the signal light 46 can be coupled with the optical waveguide. Where the signal light propagates in the optical waveguide, this optical coupling can cause crosstalk. In order to prevent such crosstalk, it is preferable to transmit the signal light from the optical waveguide 62 to the optical waveguide 61. In this case, light emerging from the end face 61a of the optical waveguide 61 is light at low intensity mainly reflected by an external optical device. Consequently, the crosstalk can be satisfactorily suppressed. This also applies to the variable optical attenuators of the third to fifth embodiments.

Seventh Embodiment

Figure 21:
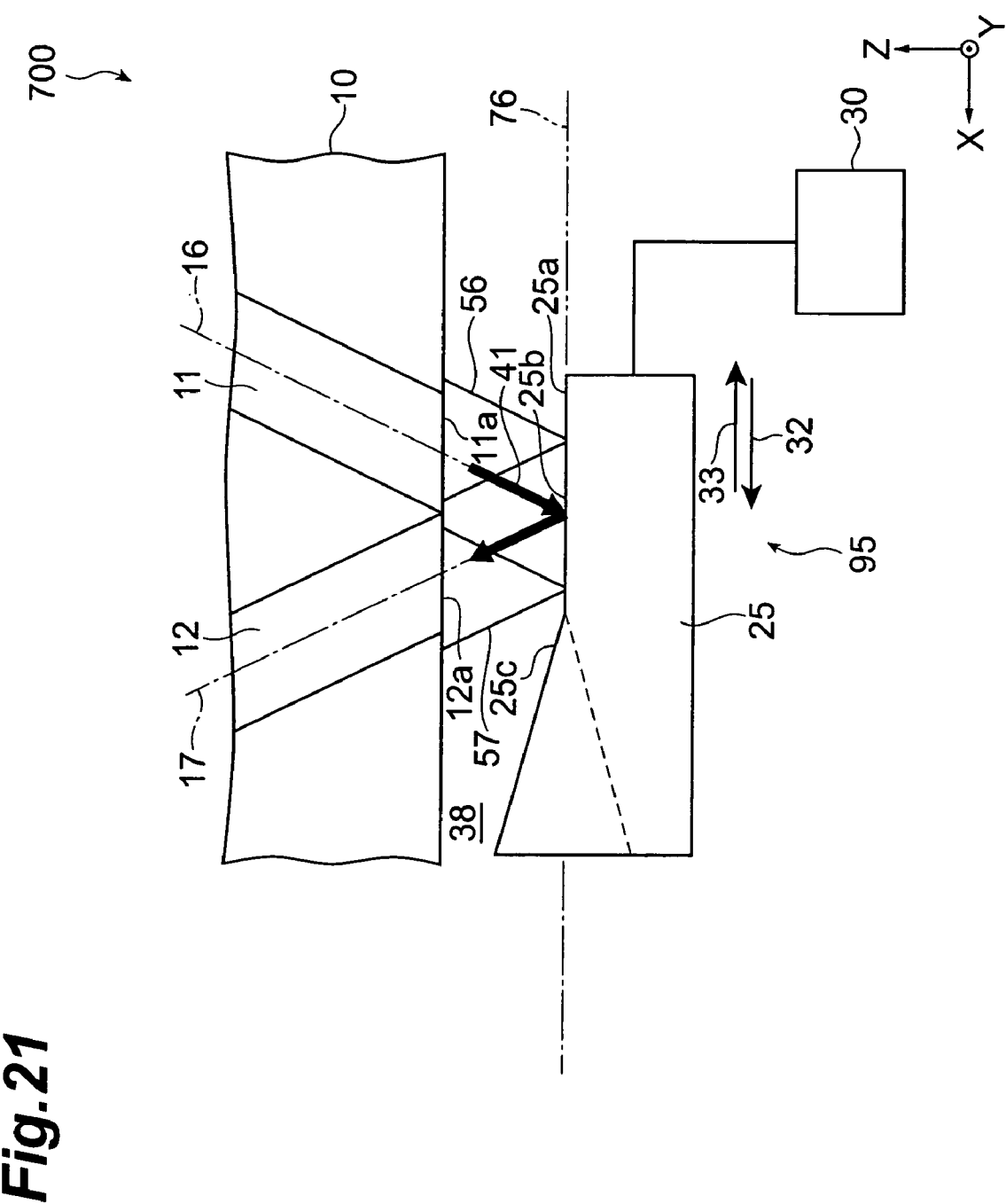
FIG. 21 is a schematic plan view showing a variable optical attenuator of a seventh embodiment.
Figure 22:
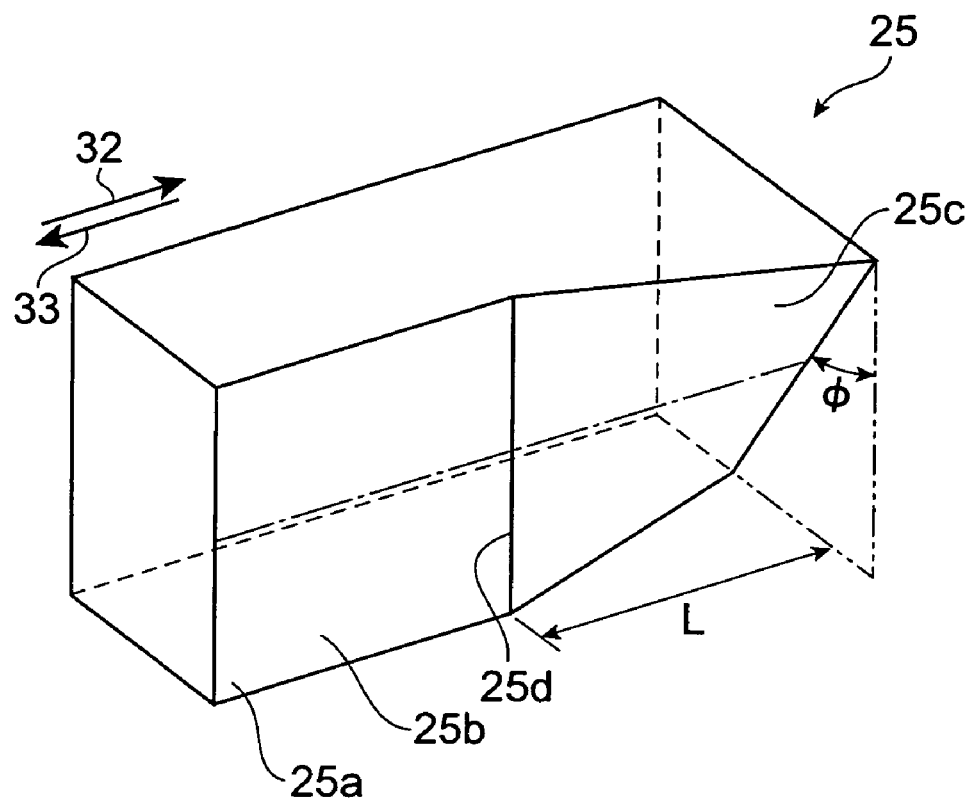
FIG. 22 is a schematic perspective view showing a movable mirror in the seventh embodiment.

FIG. 21 is a schematic plan view showing a variable optical attenuator 700 in the seventh embodiment, and FIG. 22 a schematic perspective view showing a movable mirror 25 used in the seventh embodiment. The variable optical attenuator 700 in the present embodiment has the movable mirror 25 instead of the movable mirror 21 in the variable optical attenuator 100 of the first embodiment. The movable mirror 25 and mirror driver device 30 constitute a movable reflector 95. The other structure of the variable optical attenuator 700 is the same as in the first embodiment.

The movable mirror 25 is an optical reflector having a light reflecting surface 25a. The light reflecting surface 25a has an extremely high reflectance (e.g., 90% or more) for light of the predetermined wavelength propagating in the optical waveguides 11 and 12. The light reflecting surface 25a faces the end faces 11a and 12a of the optical waveguides 11 and 12. The clearance between the light reflecting surface 25a and the end faces 11a and 12a may be filled with the index matching material 38.

The light reflecting surface 25a includes a planar portion 25b and a curved portion 25c. The planar portion 25b and curved portion 25c are connected at a boundary line 25d. The planar portion 25b is parallel to the end faces 11a and 12a of the optical waveguides 11 and 12. As the planar portions in the foregoing embodiments do, the planar portion 25b reflects the light emerging along the optical axis 16 from the optical waveguide 11 and traveling on the optical path 56 into the optical path 57 along the optical axis 17. As shown in FIG. 22, the curved portion 25c is twisted relative to the planar portion 25b at a fixed rate. In the present embodiment the twist rate is 0.3°/1 μm. Here the twist rate is represented by $\phi/L$, where $\phi$ is an angle of inclination of the distal edge of the curved portion 25c relative to the boundary line 25d and L a length from the boundary line 25d to the distal edge of the curved portion 25c.

The mirror driver device 30 moves the movable mirror 25 in directions nearly parallel to the end faces 11a and 12a of the optical waveguides 11 and 12, as indicated by arrows 32 and 33. In accordance therewith, the light reflecting surface 25a of the movable mirror 25 moves along the movement path 76. The connection (boundary line 25d) between the planar portion 25b and the curved portion 25c is movable across the optical axes 16 and 17 of the optical paths 56 and 57. The light emerging from the optical waveguides 11 and 12 is reflected by the planar portion 25b or by the curved portion 25c in accordance with the location of the light reflecting surface 25a. Just as in the above embodiments, the variable optical attenuator 700 can continuously change the power of the light propagating in the path from the optical waveguide 11 to the optical waveguide 12, or in the reverse path, according to the movement of the light reflecting surface 25a.

Since the curved portion 25c is twisted relative to the planar portion 25b, the light emerging along the optical axis 16 from the optical waveguide 11 is reflected into directions not parallel to the plane including the optical axes 16 and 17. Similarly, the light emerging along the optical axis 17 from the optical waveguide 12 is also reflected into directions not parallel to the plane including the optical axes 16 and 17. For this reason, the light from the optical waveguides 11 and 12 is reflected into the directions deviated from the optical axis 16 of the optical path 56 and from the optical axis 17 of the optical path 57 by the curved portion 25c. In consequence, the optical feedback from the optical path 56 to the optical path 56, the optical feedback from the optical waveguide 11 to the optical waveguide 11, the optical feedback from the optical path 57 to the optical path 57, and the optical feedback from the optical waveguide 12 to the optical waveguide 12 are surely reduced.

Figure 23:
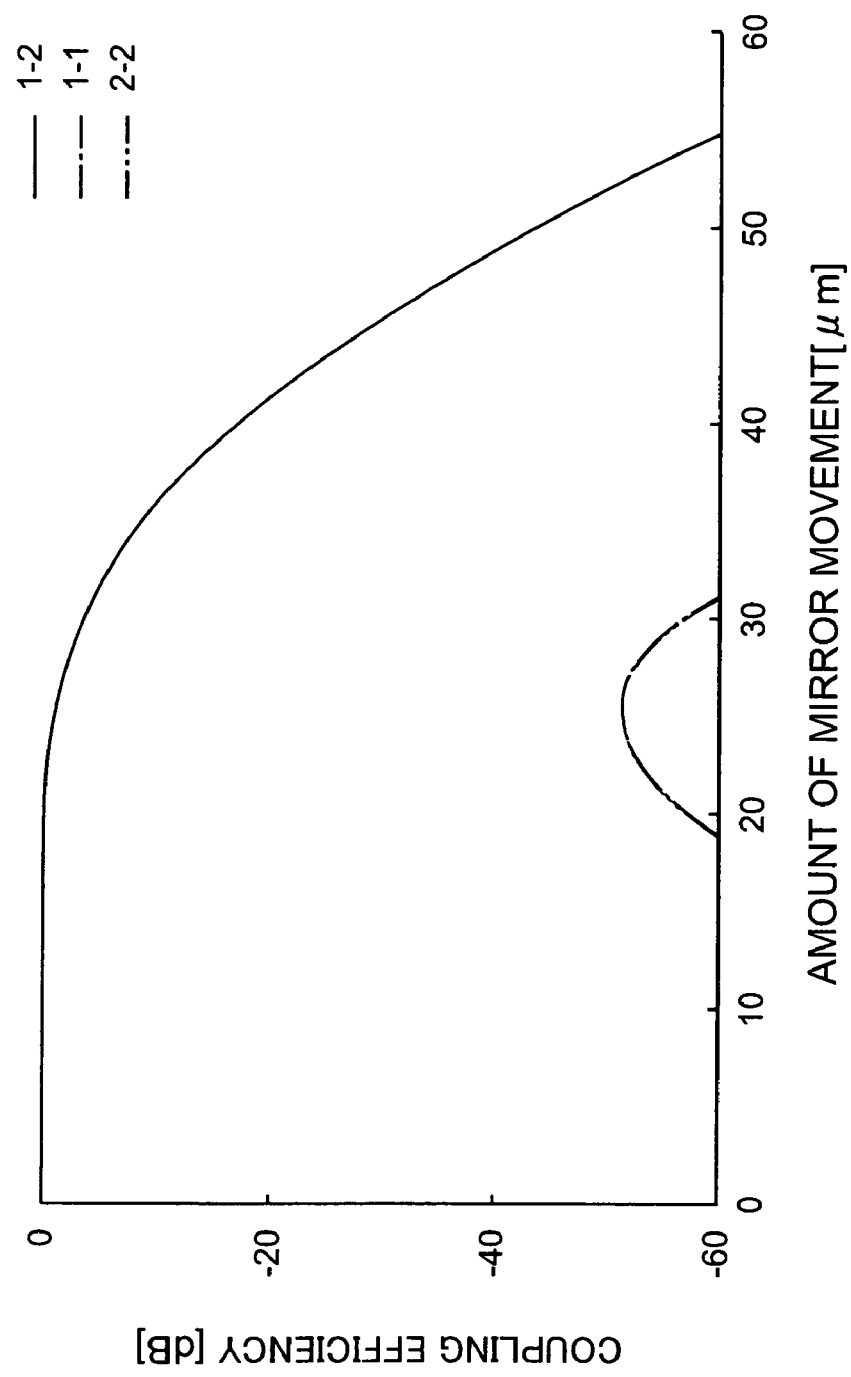
FIG. 23 is a diagram showing a relationship between the amount of the movement of a movable mirror and the coupling efficiency.

FIG. 23 shows a relationship between the movement amount of the movable mirror 25 and the coupling efficiency between the optical waveguides in an example of the present embodiment. In this example, the light transmitted by the optical waveguides 11 and 12 has the wavelength of 1.55 μm, and the Gaussian distribution with the Mode Field Diameter (MFD) of 20 μm. The angle $2\alpha$ between the optical waveguides 11 and 12 is 10°. The clearance between the end faces 11a and 12a of the optical waveguides 11 and 12, and the light reflecting surface 25a is filled with the index matching material having the refractive index of 1.45.

In FIG. 23 a solid line indicates the coupling efficiency of the light traveling from the optical waveguide 11 to the optical waveguide 12, a chain line the coupling efficiency of the light emerging from the optical waveguide 11 and returning to the optical waveguide 11, and a chain double-dashed line the coupling efficiency of the light emerging from the optical waveguide 12 and returning to the optical waveguide 12. In FIG. 23 the chain line and the chain double-dashed line are superimposed on each other. As shown in FIG. 23, the coupling efficiencies of the optical feedbacks to the optical waveguides 11 and 12 both are less than −50 dB. Therefore, the variable optical attenuator 700 of the present embodiment is able to significantly reduce the both optical feedbacks to the optical waveguides 11 and 12.

Since the optical feedbacks to the optical waveguides 11 and 12 are small enough, the variable optical attenuator 700 suitably operates even if the isolators for blocking the optical feedback are not connected to the optical waveguides 11 and 12. Therefore, it is feasible to extremely easily and inexpensively construct an optical system incorporating the variable optical attenuator 700.

Eighth Embodiment

Figure 24:
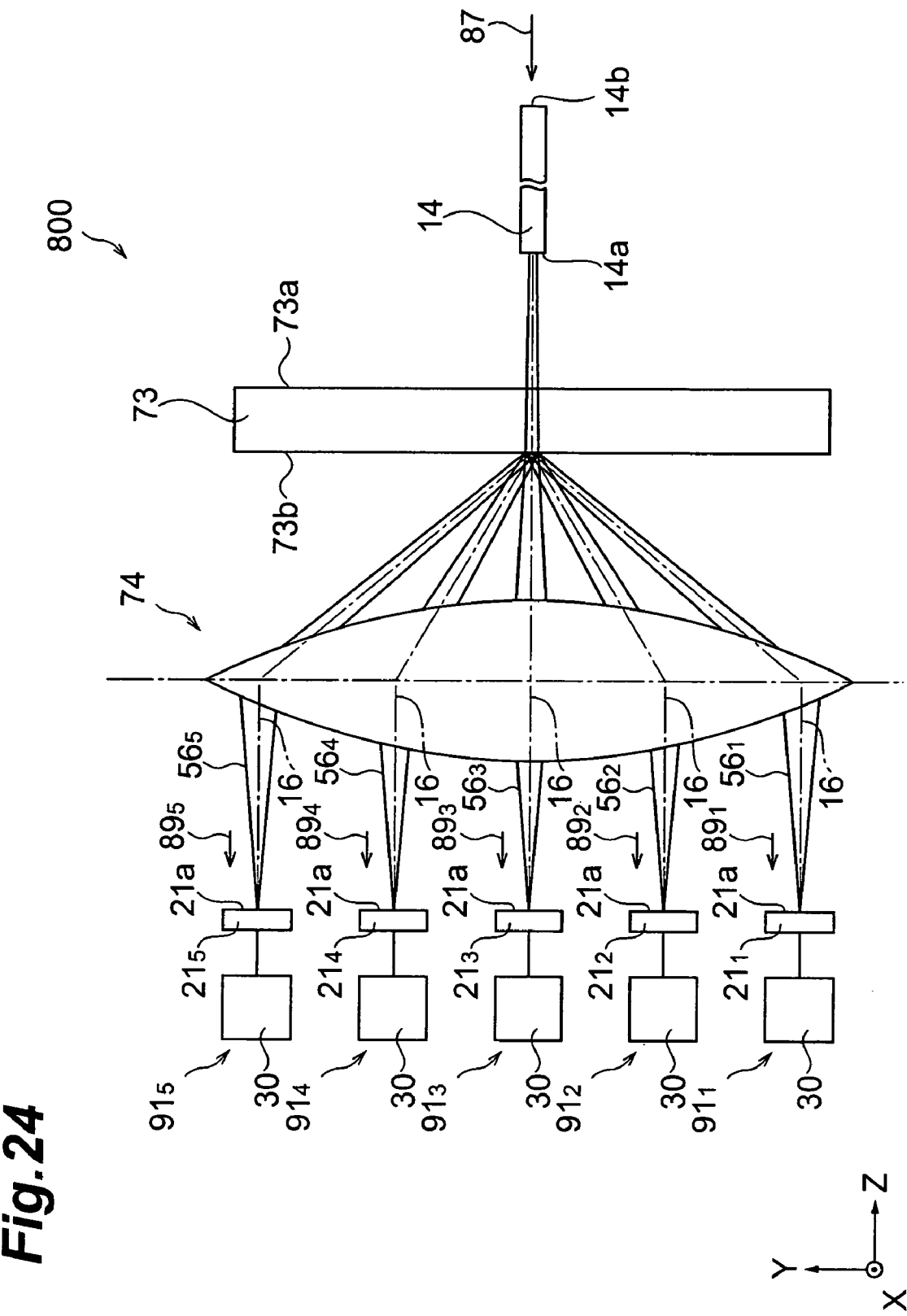
FIG. 24 is a schematic plan view showing a variable optical attenuator of an eighth embodiment.
Figure 25:
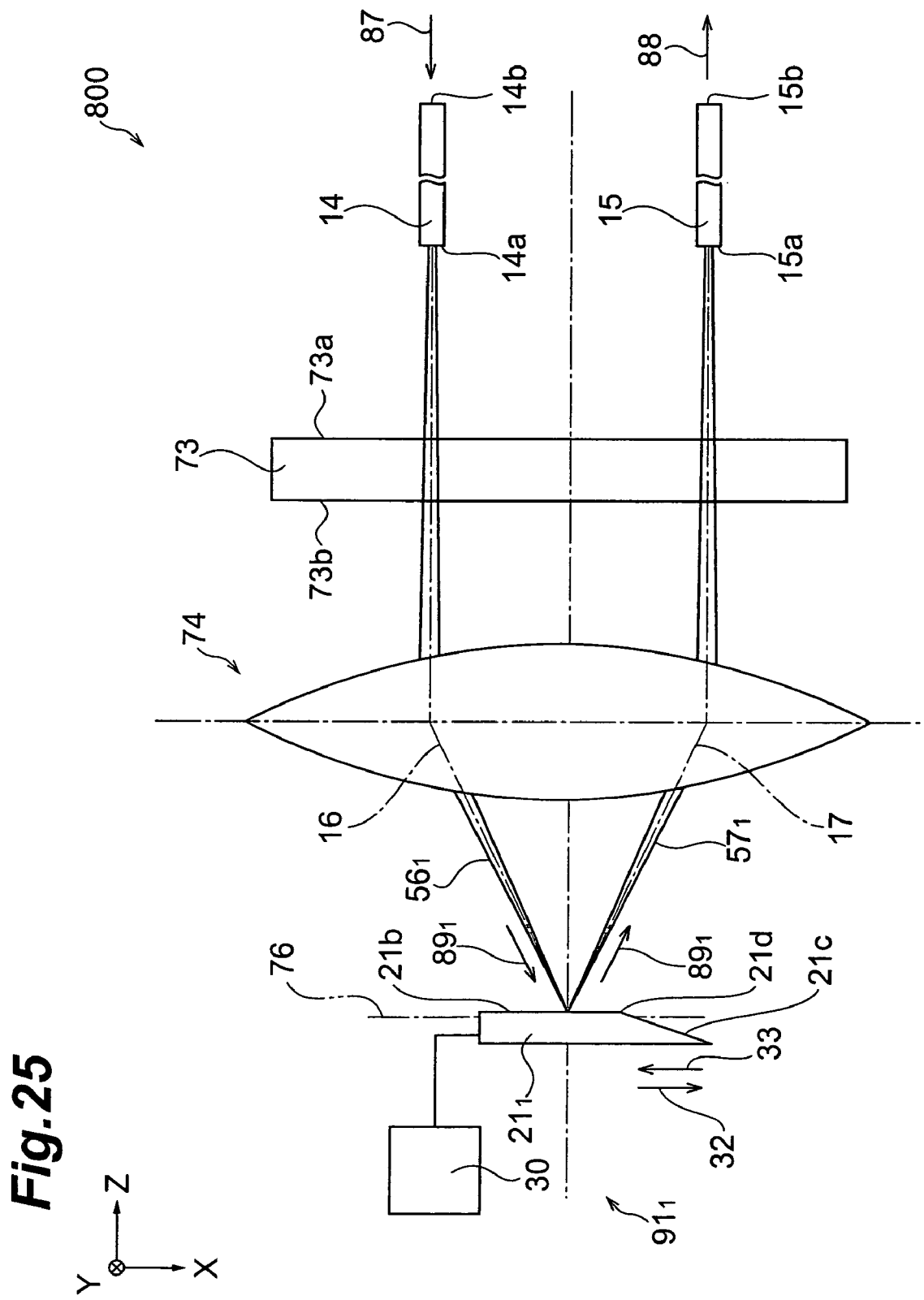
FIG. 25 is a schematic side view showing the variable optical attenuator in the eighth embodiment.

FIG. 24 and FIG. 25 are a schematic plan view and a schematic side view showing a variable optical attenuator 800 in the eighth embodiment. The variable optical attenuator 800 is a multi-channel (five channels in the present embodiment) signal processor. The variable optical attenuator 800 has an input optical fiber 14, an output optical fiber 15, a transmissive diffraction grating 73, a condenser lens 74, and a plurality of (five in the present embodiment) movable reflectors 91. In the description hereinafter, in order to discriminate these movable reflectors 91 from each other, they are denoted by reference symbols with subscripts $91_1$ to $91_5$.

The input fiber 14 is an optical waveguide for receiving an input light signal 87. The input light signal 87 is wavelength-multiplexed light that contains a plurality of (five in the present embodiment) light components having their respective wavelengths different from each other. The input fiber 14 receives the input light signal 87 at one end 14b thereof, and transmits the input light signal 87 to output it from the other end 14a. Namely, the end 14b acts as an input port of the variable optical attenuator 800.

The output fiber 15 is an optical waveguide for outputting an output light signal 88. The output light signal 88 is wavelength-multiplexed light consisting of as many light components as those of the input light signal 87. The output fiber 15 receives the output light signal 88 at one end 15a thereof, and transmits the output light signal 88 to output it from the other end 15b. Namely, the end 15b acts as an output port of the variable optical attenuator 800.

The diffraction grating 73 is an optical multiplexer/demultiplexer for receiving the input light signal 87 from the input fiber 14 to demultiplex it into light components $89_1$ to $89_5$ and for multiplexing those light components $89_1$ to $89_5$ into the output light signal 88. One surface 73a of the diffraction grating 73 faces the end 14a of the input fiber 14 and the end 15a of the optical fiber 15. The other surface 73b of the diffraction grating 73 faces the condenser lens 74.

The condenser lens 74 is placed between the diffraction grating 73 and the movable reflector $91_1$–$91_5$. The condenser lens 74 condenses all the components $89_1$ and $89_5$ demultiplexed by the diffraction grating 73 and emits the condensed components toward the respective movable reflectors $91_1$ to $91_5$. The condenser lens 74 also receives and condenses the components $89_1$ to $89_5$ reflected by the movable reflecting devices $91_1$ to $91_5$ and emits them toward the diffraction grating 73.

Each of the movable reflectors $91_1$ to $91_5$ has the same configuration as the movable reflector 91 in the first embodiment. The movable reflectors $91_1$ to $91_5$ have their respective movable mirrors $21_1$ to $21_5$, in addition to the mirror driver device 30. Each of the movable mirrors $21_1$ to $21_5$ has the same configuration as the movable mirror 21 in the first embodiment. The first planar portions 21b of the light reflecting surfaces 21a of the movable mirrors $21_1$–$21_5$ are nearly located at the positions where the components $89_1$–$89_5$ are converged by the condensing action of the condenser lens 74, i.e., at the points of convergence of the component $89_1$–$89_5$.

In the present embodiment the first planar portions 21b of the light reflecting surfaces 21a are placed perpendicularly to the optical axis of the condenser lens 74. The mirror driver devices 30 reversibly move the respective movable mirrors $21_1$ to $21_5$ along directions 32 and 33 normal to the optical axis of the condenser lens 74. In accordance therewith, the light reflecting surfaces 21a of the movable mirrors 21 move along a movement path 76. The optical axis of the condenser lens 74 is parallel to the Z-axis direction. In the present embodiment the movement path 76 is of linear shape extending substantially in the X-axis direction. However, the movement path 76 may also be of curved shape.

The first to fifth pairs of two optical paths 56 and 57 not parallel to each other are provided between the light reflecting surfaces 21a of the movable mirrors $21_1$ to $21_5$ and the lens surface of the condenser lens 74. In the description hereinafter, the optical paths 56 and 57 included in the first to fifth pairs will be denoted by reference numbers $56_1$–$56_5$ and $57_1$–$57_5$, respectively. FIG. 25 shows an illustration of only a pair of optical paths $56_1$ and $57_1$, and the other pairs of optical paths have similar arrangements. The light components $89_1$–$89_5$ emerging from the condenser lens 74 travel on the respective paths $56_1$–$56_5$ while converging.

The connection between the first planar portion 21b and the second planar portion 21c of the light reflecting surface 21a of the movable mirror 21, is movable across the optical axes 16 and 17 of the optical paths $56_1$ and $57_1$ of the first pair. The light reflecting surfaces 21a of the other movable mirrors also move in similar fashion. Namely, the connection between the first planar portion 21b and the second planar portion 21c of the light reflecting surface 21a of the movable mirror $21_k$ is movable across the optical axes 16 and 17 of the optical paths $56_k$ and $57_k$ of the Kth pair.

When the movable mirror $21_1$ is located at the position shown in FIG. 25, the light component $89_1$ travels on the optical path $56_1$ toward the mirror $21_1$ and impinges on the first planar portion 21b. When the first planar portion 21b receives the light component $89_1$ from the optical path $56_1$, it reflects the light component $89_1$ into the optical path $57_1$. The light component $89_1$ travels on the optical path $57_1$ back to the condenser lens 74, and then travels toward the diffraction grating 73 as being converged by the condenser lens 74. The other movable mirrors also operate in similar fashion. Namely, when the first planar portion 21b of the movable mirror $21_k$ (K is an integer from 1 to 5) receives the light component $89_k$, it reflects the light component $89_k$ along the optical path 57. The light component $89_k$ travels on the optical path $57_k$ back to the condenser lens 74, and then travels toward the diffraction grating 73 as being converged by the condenser lens 74. As descried above, the optical path $57_k$ is an optical path on which the light component $89_k$ from the optical path $56_k$ travels after being reflected by the first planar portion 21b.

The diffraction grating 73 multiplexes the light components $89_1$–$89_5$ into the output light signal 88. The output light signal 88 enters the output fiber 15 through the end 15a. The output fiber 15 transmits this output light signal 88 and emits it through the end 15b.

As the movable mirror $21_k$ is moved in the direction indicated by arrow 33, from the position shown in FIG. 25, the light component $89_k$ comes to be reflected by the second planar portion 21c. When the second planar portion 21c receives the light component $89_k$, it reflects the light component $89_k$ into the direction deviated from the optical path $57_k$. This decreases the coupling efficiency of the light component $89_k$ from the optical path $56_k$ to the optical path $57_k$. In accordance therewith, the power of the light component $89_k$ in the output light signal 88 generated by the diffraction grating 73 becomes lowered.

When the vicinity of edge 21d of the movable mirror $21_k$ is irradiated with the light component $89_k$, part of the light component $89_k$ is reflected by the first planar portion 21b and the rest by the second planar portion 21c. The quantities of light received by the first and second planar portions 21b and 21c vary according to the movement of the light reflecting surface 21a of the movable mirror $21_k$. Therefore, the power of the light propagating from the optical path $56_k$ to the optical path $57_k$ and the power of the light component $89_k$ in the output light signal 88 can be continuously changed according to the movement of the light reflecting surface 21a of the movable mirror $21_k$. Since the movable reflecting devices $91_1$ to $91_5$ individually move the light reflecting surfaces 21a of the movable mirrors $21_1$ to $21_5$, the variable optical attenuator 800 is able to individually change the powers of the light components $89_1$–$89_5$. Therefore, for example, when the powers of the light components $89_1$–$89_5$ in the input light signal 89 are uneven, these powers can be equalized in the output light signal 88.

The variable optical attenuator 800 reflects the light components $89_1$–$89_5$ with the movable mirrors $21_1$–$21_5$, thereby demultiplexing the input light signal 87 and multiplexing the light components $89_1$–$89_5$ with the single diffraction grating 73. This structure obviates the need for use of a plurality of expensive diffraction gratings. Accordingly, it is feasible to produce the variable optical attenuator 800 at low cost.

The variable optical attenuator 800 is suitable for use in combination with an optical amplifier. Since the variable optical attenuator 800 reduces the optical feedbacks to the input paths $56_1$–$56_5$, stable transmission quality can be obtained when amplifying the output light signal using the optical amplifier.

The variable optical attenuator 800 may be mounted together with a light intensity monitor and a control unit so as to constitute one module. The light intensity monitor extracts part of the components $89_1$–$89_5$ to measure their intensities individually. The part of the components may be extracted using a half mirror or the diffraction by the diffraction grating 73 which has an order different from one used to form the optical paths $56_1$–$56_5$. The control unit controls the operation of the movable reflectors 91 in the variable optical attenuator 800 in accordance with the intensities of the components measured by the light intensity monitor, so as to equalize the powers of the components in the input signal light. Since the optical feedbacks to the input paths $56_1$–$56_5$ are reduced by the variable optical attenuator 800, this module is able to achieve stable transmission quality. The foregoing light intensity monitor may be installed outside the module.

The present embodiment uses the movable reflectors 91 as the first embodiment does. Instead thereof, however, it is also possible to use the movable reflectors 92–95 as in the other embodiments. In this case, when the planar portion 22b–25b of the movable mirror 22–25 receives the light component 89 from the optical path 56, it reflects the light component 89 into the optical path 57. This light component 89 travels on the optical path 57 back to the condenser lens 74, and then travels toward the diffraction grating 73 while being converged by the condenser lens 74. As described, the optical path 57 is an optical path in which the light component 89 from the optical path 56 travels after being reflected by the planar portion 22–25.

The present embodiment uses the transmissive diffraction grating 73 as an optical multiplexer/demultiplexer, but it may also use a reflective diffraction grating or another optical multiplexer/demultiplexer. It is also possible to separately prepare an optical demultiplexer for demultiplexing the input light signal 88 into a plurality of light components 89 and an optical multiplexer for multiplexing these light components 89, instead of the single optical multiplexer/demultiplexer.

Instead of demultiplexing the wavelength-multiplexed light and multiplexing the wavelength components, it is also possible to adopt a configuration for decomposing multiplexed light that contains light components having different characteristics other that wavelengths into these light components and then combining them into the multiplexed light. Namely, the optical demultiplexer is an example of an optical decomposer for decomposing multiplexed light that contains light components having different characteristics into these light components, and the optical multiplexer an example of an optical composer for combining those light components into the multiplexed light. Another potential example is such that the optical decomposer decomposes polarization-multiplexed light that contains light components having different planes of polarization into these light components, and the optical composer combines the light components into the polarization-multiplexed light.

Needless to mention, the number of light components and movable reflecting devices 91 is not limited to 5 in the present embodiment, and it can be selected from arbitrary integers of 2 or more.

The present invention was described above in detail on the basis of the embodiments thereof. It is, however, noted that the present invention is by no means intended to be limited to the above embodiments. The present invention can be modified in various ways within the scope not departing from the spirit of the present invention.

Figure 26:
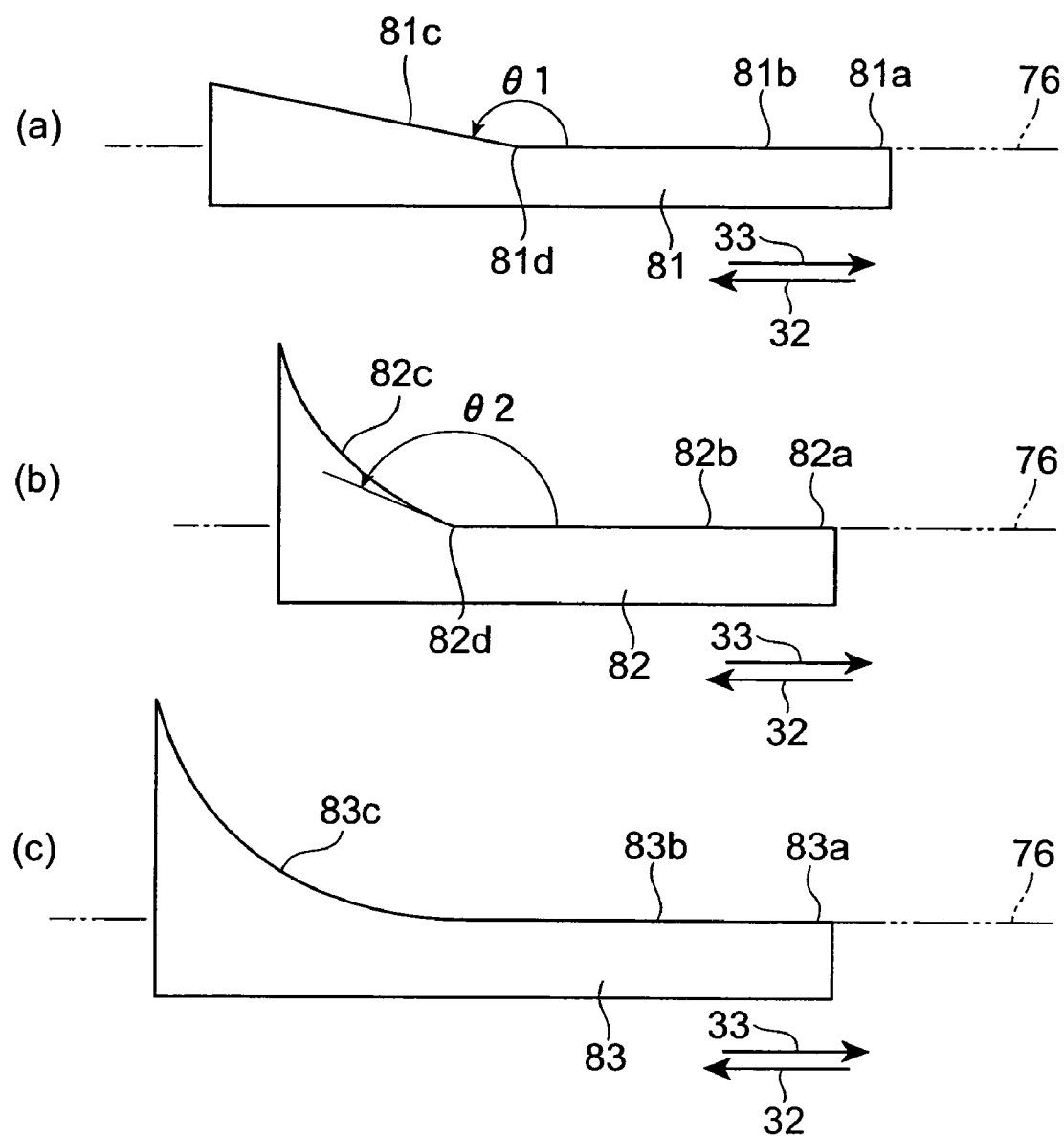
FIG. 26 is a schematic plan view showing other examples of the movable mirrors.

The variable optical attenuator 100 of the first embodiment may have a movable mirror 81 shown in FIG. 26(a), instead of the movable mirror 21. The movable mirror 81 has a light reflecting surface 81a including a first planar portion 81b and a second planar portion 81c connected to each other. The connection (boundary) between the first and second planar portions 81b and 81c forms an edge 81d. The first planar portion 81b is the same as the first planar portion 21b of the movable mirror 21. The first planar portion 81b is arranged in parallel with the end faces 11a and 12a of the optical waveguides 11 and 12. The second planar portion 81c and the second planar portion 21c of the movable mirror 21 are in mirror symmetry with respect to the plane including the first planar portion 81b. The second planar portion 81c forms an angle of θ1 in counterclockwise rotation from the first planar portion 81b. Just as in the case of the first embodiment, the angle θ1 satisfies the condition of $175° \leq θ1 < 180°$.

Similarly, the variable optical attenuator 300 of the third embodiment may have a movable mirror 82 shown in FIG. 26(b), instead of the movable mirror 22. The movable mirror 82 has a light reflecting surface 82a including a planar portion 82b and a curved portion 82c connected to each other. The connection (boundary) between the planar portion 82b and the curved portion 82c forms an edge 82d. The planar portion 82b is the same as the planar portion 22b of the movable mirror 22. The planar portion 82b is arranged in parallel with the end faces 11a and 12a of the optical waveguides 11 and 12. The curved portion 82c and the curved portion 22c of the movable mirror 22 are in mirror symmetry with respect to the plane including the planar portion 82b. A tangent plane of the curved portion 82c at the edge 82d forms an angle of θ2 in counterclockwise rotation from the planar portion 82b. Just as in the case of the second embodiment, the angle θ2 satisfies the condition of $175° \leq θ2 < 180°$.

Furthermore, the variable optical attenuator 400 of the fourth embodiment may have a movable mirror 83 shown in FIG. 26(c), instead of the movable mirror 23. The movable mirror 83 has a light reflecting surface 83a including a planar portion 83b and a curved portion 83c connected to each other. The planar portion 83b is the same as the planar portion 23b of the movable mirror 23. The planar portion 83b is arranged in parallel with the end faces 11a and 12a of the optical waveguides 11 and 12. The curved portion 83c and the curved portion 23c of the movable mirror 22 are in mirror symmetry with respect to the plane including the planar portion 83b. The movable mirror 83 corresponds to the movable mirror 82 when the angle θ2 becomes 180°. The curved portion 83c is smoothly connected to the planar portion 83b. Just as in the case of the fifth embodiment, another planar portion may be smoothly connected to the curved portion 83c at its end located away from the planar portion 83b.

In the fifth and sixth embodiments, the second planar portion 24d is smoothly connected to the curved portion 24c. In other words, the second planar portion 24d forms the angle of 180° with the tangent plane at the end of the curved portion 24c connected to the second planar portion 24d. However, the second planar portion 24d does not always have to be smoothly connected to the curved portion 24c. When the second planar portion 24d forms the angle θ3 satisfying the condition of $175° \leq θ3 \leq 180°$ in either clockwise or counterclockwise rotation from the tangent plane at the end of the curved portion 24c, at least either the optical feedback to the optical path 56 and the first optical waveguide 11 or the optical feedback to the optical path 57 and the second optical waveguide 12 can be significantly reduced for the same reason as in the aforementioned case of the angle θ2.

In the foregoing embodiments the ends of the two optical waveguides are arranged in symmetry with respect to the reference plane. In the optical devices of the present invention, however, the two optical waveguides do not always have to be arranged in symmetry with respect to a specific reference plane. For example, in an optical device shown in FIG. 27(a), the ends of optical waveguides 11 and 12 form different angles α1 and α2 with the plane 13. In another configuration, as shown in FIG. 27(b), the ends of two optical waveguides 11 and 12 may cross and overlap with each other.

In the foregoing embodiments the movable mirror linearly moves in the directions parallel to the planar portion of the movable mirror. However, the movement of the movable mirror and the light reflecting surface does not always have to be linear motion. For example, the movable mirror may be moved in such a manner that the movable mirror is fixed to one end of a straight rod-like arm and that the arm is pivoted about the other end of the arm to move the movable mirror. In this case, the trajectory of the motion of the movable mirror and the light reflecting surface is approximately arc of circle.

The above embodiments present the variable optical attenuators as an example of the optical devices of the present invention. However, the present invention may be any other optical device for changing the power of light propagating from one optical waveguide or optical path to another optical waveguide or optical path. For example, the variable optical attenuators of the above embodiments can almost nullify the power of light propagating from one optical waveguide to another optical waveguide by moving the movable mirror. Therefore, these variable optical attenuators can be used as 1×1 optical switches for switching on and off light propagating in optical waveguides. In addition, the variable optical attenuators 200 and 600 of the second and sixth embodiments can be used as a 1×2 optical switch for selectively transmitting the light from the optical waveguide 62 into the optical waveguide 61 or into the optical waveguide 63 according to the location of the light reflecting surface 21a or 24a.

In the optical devices of the present invention, the thickness of the movable mirror in the direction normal to the light reflecting surface can be arbitrarily determined. For example, the movable mirror may have a uniform thickness in the direction normal to the light reflecting surface.

In the optical devices of the present invention, the movable mirror or the mirror driver device is preferably produced by the micro electro mechanical system (MEMS) technology. Examples of the mirror driver device include an electrostatic actuator, an electromagnetic actuator utilizing electromagnetic force, and an actuator utilizing thermal deformation. For example, an electrostatic actuator has a movable electrode part and a stationary electrode part, and a mirror is set on the movable electrode part. The movable electrode part is moved by electrostatic force generated between the two electrodes to move the mirror correspondingly.

The optical waveguides 11 and 12 of the optical devices in the first to seventh embodiments are planar waveguides provided on PLC. However, the planar waveguides may be replaced with other optical waveguides such as optical fibers. The first to seventh embodiments use the PLC as an optical element forming the optical paths. However, the optical paths may be formed by another optical element (e.g., the condenser lens 74 in the eighth embodiment).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical device comprising:
    first to Nth (N is an integer of 2 or more) pairs of optical paths, each pair including a first and second optical path having optical axes not parallel to each other;
    first to Nth light reflecting surfaces movable along predetermined paths;
    an optical decomposer for decomposing multiplexed light that contains first to Nth components having different characteristics into the first to Nth components; and
    an optical composer for combining the decomposed first to Nth components into the multiplexed light,
    the Kth (K is an integer from 1 to N) decomposed component traveling through the first optical path of the Kth pair,
    the Kth reflecting surface having a first planar portion for reflecting the Kth decomposed component from the first optical path of the Kth pair toward the second optical path of the Kth pair, and a second planar portion having a connection to the first planar portion,
    the Kth reflecting surface being movable to allow the connection between the first and second planar portions of the Kth reflecting surface to cross the optical axis of the first optical path of the Kth pair,
    in the Kth reflecting surface, the second planar portion forming an angle θ1 with the first planar portion, angle θ1 satisfying a condition of 175°≦θ1<180° in either clockwise or counterclockwise rotation from the first planar portion,
    the optical composer combining the first to Nth components traveling on the second optical paths of the first to Nth pairs.

2. The optical device according to claim 1, wherein the first to Nth components have different wavelengths,
    wherein the multiplexed light is wavelength-multiplexed light that contains the first to Nth components,
    wherein the optical decomposer is an optical demultiplexer for demultiplexing the wavelength-multiplexed light into the first to Nth components, and
    wherein the optical composer is an optical multiplexer for multiplexing the first to Nth components into the wavelength-multiplexed light.

3. An optical device comprising:
    a first and second optical path having axes not parallel to each other;
    a first optical waveguide optically coupled to the first optical path,
    a second optical waveguide optically coupled to the second optical path, the second optical waveguide being distinct from the first optical waveguide, and
    a light reflecting surface movable along a predetermined path,
    the light reflecting surface having a first planar portion for reflecting light from the first optical path toward the second optical path and sending the reflected light into the second optical waveguide, and a second planar portion having a connection to the first planar portion,
    the light reflecting surface being movable to allow the connection between the first and second planar portions to cross the optical axis of the first optical path,
    the second planar portion forming an angle θ1 with the first planar portion, angle θ1 satisfying a condition of 175°≦θ1<180° in either clockwise or counterclockwise rotation from the first planar portion.

4. The optical device according to claim 3, further comprising a third optical waveguide for receiving light reflected by the second planar portion, the third optical waveguide being distinct from the first and second optical waveguides.

5. An optical device for an optical communication, comprising:
    a first and second optical path having axes not parallel to each other;
    a first optical waveguide optically coupled to the first optical path,
    a second optical waveguide optically coupled to the second optical path; and
    a light reflecting surface movable along a predetermined path, the light reflecting surface having a first planar portion for reflecting light from the first optical path toward the second optical path, and a curved portion having a connection to the first planar portion, the light reflecting surface being movable to allow the connection between the first planar portion and the curved portion to cross the optical axis of the first optical path, the curved portion having a tangent plane at the connection forming an angle $\theta2$ with the first planar portion, angle $\theta2$ satisfying a condition of $175°\leq\theta2\leq180°$ in either clockwise or counterclockwise rotation from the first planar portion, the curved portion being twisted relative to the first planar portion.

6. An optical device for an optical communication, comprising:

a first and second optical path having axes not parallel to each other;

a first optical waveguide optically coupled to the first optical path, a second optical waveguide optically coupled to the second optical path; and a light reflecting surface movable along a predetermined path, the light reflecting surface having a first planar portion for reflecting light from the first optical path toward the second optical path, and a curved portion having a connection to the first planar portion, the light reflecting surface being movable to allow the connection between the first planar portion and the curved portion to cross the optical axis of the first optical path, the curved portion having a tangent plane at the connection forming an angle $\theta2$ with the first planar portion, angle $\theta2$ satisfying a condition of $175°\leq\theta2\leq180°$ in either clockwise or counterclockwise rotation from the first planar portion, the light reflecting surface further having a second planar portion having a connection to the curved portion at a location away from the first planar portion, the first planar portion and planes tangent to the curved portion forming angles that vary monotonically with their distance from the first planar portion, the second planar portion forming an angle $\theta3$ with a plane tangent to the curved portion at the location away from the first planar portion, angle $\theta3$ satisfying a condition of $175°\leq\theta3\leq180°$ in either clockwise or counterclockwise rotation from the tangent plane at the location away from the first planar portion, the optical device further comprising a third optical waveguide for receiving light reflected by the second planar portion, the third optical waveguide being distinct from the first and second optical waveguides.

7. An optical device comprising:

an input optical waveguide for transmitting multiplexed light that contains first to Nth components having different characteristics;

an optical decomposer for decomposing multiplexed light into the first to Nth components, the optical decomposer being optically coupled with the input optical waveguide via an input optical path;

first to Nth (N is an integer of 2 or more) pairs of optical paths, each pair including a first and second optical path having axes not parallel to each other;

first to Nth light reflecting surfaces movable along predetermined paths;

an optical composer for combining the decomposed first to Nth components into the multiplexed light; and an output optical waveguide for receiving the multiplexed light from the optical composer, the output optical waveguide being distinct from the input optical waveguide and optically coupled with the optical composer via an output optical path distinct from the input optical path, the Kth (K is an integer from 1 to N) decomposed component traveling on the first optical path of the Kth pair, the Kth reflecting surface having a first planar portion for reflecting the Kth decomposed component from the first optical path of the Kth pair toward the second optical path of the Kth pair, and a curved portion having a connection to the first planar portion, the Kth reflecting surface being movable to allow the connection between the first planar portion and the curved portion of the Kth reflecting surface to cross the optical axis of the first optical path of the Kth pair, in the Kth reflecting surface, the curved portion having a tangent plane at the connection forming an angle $\theta2$ with the first planar portion, angle $\theta2$ satisfying a condition of $175°\leq\theta2\leq180°$ in either clockwise or counterclockwise rotation from the first planar portion, and the optical composer combining the first to Nth components traveling on the second optical paths of the first to Nth pairs.

8. The optical device according to claim 7, wherein the first to Nth components have different wavelengths, wherein the multiplexed light is wavelength-multiplexed light that contains the first to Nth components, wherein the optical decomposer is an optical demultiplexer for demultiplexing the wavelength-multiplexed light into the first to Nth components, and wherein the optical composer is an optical multiplexer for multiplexing the first to Nth components into the wavelength-multiplexed light.

* * * * *